(12) United States Patent
Liddle

(10) Patent No.: US 12,434,758 B2
(45) Date of Patent: Oct. 7, 2025

(54) ASSEMBLY FOR EQUIPPING MOTOR VEHICLE WITH DUAL-STEER CAPABILITIES

(71) Applicant: Fontaine Modification Company, Charlotte, NC (US)

(72) Inventor: Josh Liddle, Charlotte, NC (US)

(73) Assignee: Fontaine Modification Company, Charlotte, NC (US)

( * ) Notice: Subject to any disclaimer, the term of this patent is extended or adjusted under 35 U.S.C. 154(b) by 0 days.

(21) Appl. No.: 18/439,128

(22) Filed: Feb. 12, 2024

(65) Prior Publication Data

US 2024/0278823 A1      Aug. 22, 2024

Related U.S. Application Data

(60) Provisional application No. 63/485,335, filed on Feb. 16, 2023.

(51) Int. Cl.
   B62D 1/20      (2006.01)
   B62D 1/22      (2006.01)

(52) U.S. Cl.
   CPC ........ B62D 1/20 (2013.01); B62D 1/22 (2013.01)

(58) Field of Classification Search
   CPC .................................. B62D 1/20; B62D 1/22
   See application file for complete search history.

(56) References Cited

U.S. PATENT DOCUMENTS

| | | | |
|---|---|---|---|
| 1,274,978 A | 8/1918 | Bishop |
| 2,406,261 A | 8/1946 | Sprinkel |
| 2,508,686 A | 5/1950 | Rice |
| 2,512,876 A | 6/1950 | Rice |
| 2,617,661 A | 11/1952 | Kucera |
| 2,707,109 A | 4/1955 | Umstott |
| 2,736,211 A | 2/1956 | Umstott |
| 2,791,915 A | 5/1957 | Merry |
| 3,814,204 A | 6/1974 | Larkin |
| 4,756,552 A | 7/1988 | Martinez |
| 4,815,331 A | 3/1989 | Land |

(Continued)

FOREIGN PATENT DOCUMENTS

| | | |
|---|---|---|
| CN | 102602447 A | 7/2012 |
| CN | 105235735 A | 1/2016 |

(Continued)

*Primary Examiner* — Drew J Brown
(74) *Attorney, Agent, or Firm* — Andrus Intellectual Property Law, LLP

(57) ABSTRACT

An assembly for equipping a motor vehicle with dual-steer capabilities has a first bracket assembly configured to couple a first steering column to the vehicle and a second bracket assembly configured to couple a second steering column to the vehicle. A first gearset is coupled to the first bracket assembly and configured for operative engagement with the first steering column. A second gearset is coupled to the second bracket assembly and configured for operative engagement with the second steering column. A cross shaft operatively couples the first gearset to the second gearset. The first gearset is configured to be operatively coupled to a steering gear of the vehicle. The first bracket assembly is configured to facilitate tilting of an upper steering shaft of the first steering column with respect to a lower steering shaft of the first steering column.

18 Claims, 17 Drawing Sheets

(56) References Cited

U.S. PATENT DOCUMENTS

| | | | |
|---|---|---|---|
| 4,911,261 A | 3/1990 | Conley |
| 4,921,066 A | 5/1990 | Conley |
| 5,501,567 A | 3/1996 | Lanzdorf |
| 9,038,761 B2 | 5/2015 | Alton |

FOREIGN PATENT DOCUMENTS

| | | | | | |
|---|---|---|---|---|---|
| DE | 19642956 A1 | | 4/1998 | | |
| EP | 3315382 A1 | | 5/2018 | | |
| EP | 3508397 A1 | | 7/2019 | | |
| EP | 3587218 A1 | | 1/2020 | | |
| EP | 3508397 B1 | * | 6/2022 | ............... | B62D 1/22 |
| FR | 3055292 A1 | * | 3/2018 | | |
| FR | 3095631 A1 | * | 11/2020 | ............... | B62D 1/22 |
| GB | 204340 A | | 2/1924 | | |
| GB | 1032086 A | | 6/1966 | | |
| WO | 2018037181 A1 | | 3/2018 | | |

\* cited by examiner

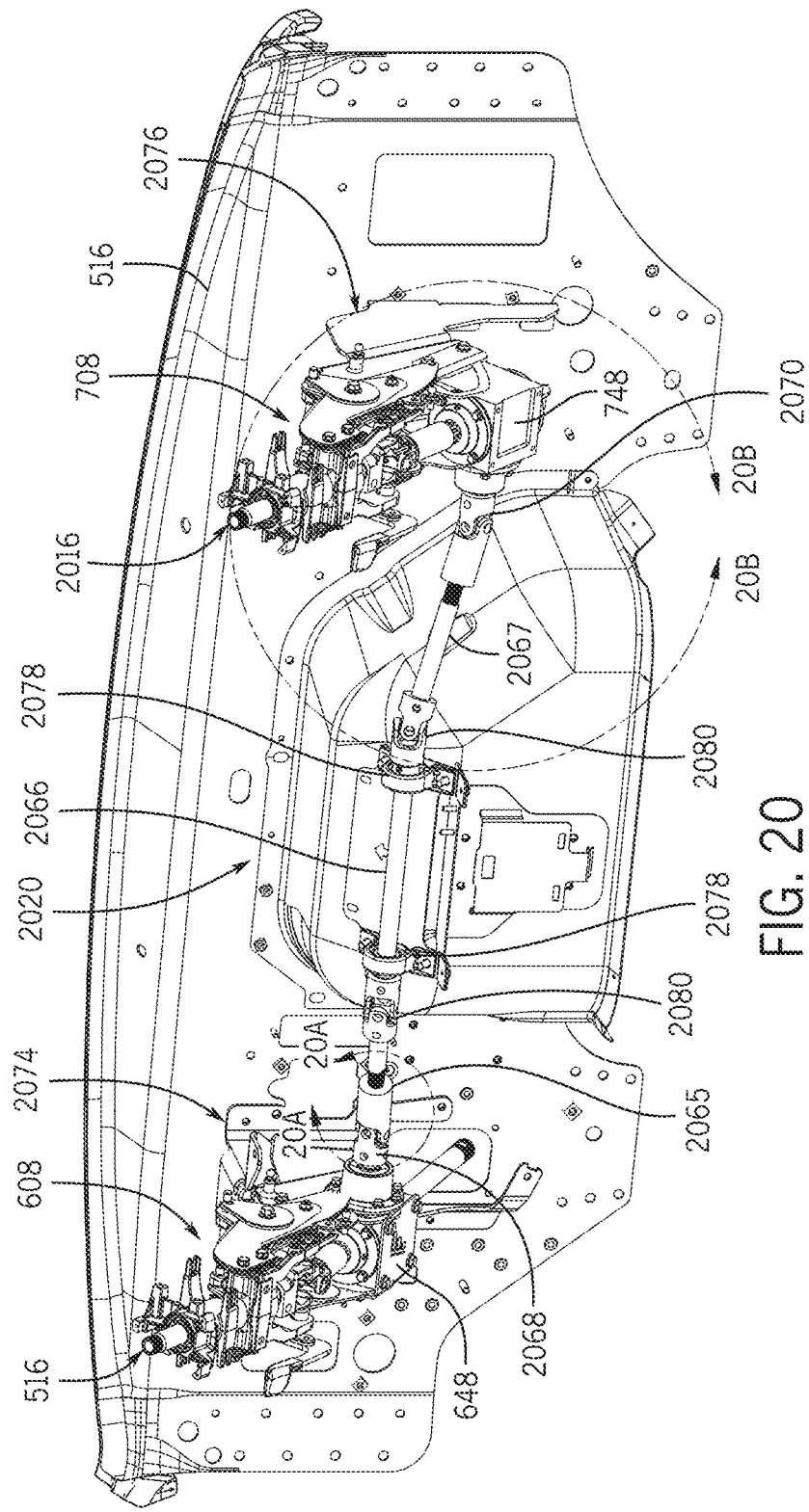

ASSEMBLY FOR EQUIPPING MOTOR VEHICLE WITH DUAL-STEER CAPABILITIES

CROSS-REFERENCE TO RELATED APPLICATION

The present application claims the benefit of U.S. patent application Ser. No. 63/485,335, filed Feb. 16, 2023, which is hereby incorporated by reference herein.

FIELD

The present disclosure relates to modifications to motor vehicles that allow for two steering wheels to be installed on a single dash.

BACKGROUND

Steering shafts of motor vehicles serve for transmitting the rotary motion from a steering wheel to a steering gear. Such steering shafts conventionally comprise several straight segments each connected via a universal joint (U-joint), wherein a rearward (with reference to the forward driving direction) steering shaft segment adjoins the steering wheel. The rearward steering shaft segment adjoins another more forwardly situated steering shaft segment via a universal joint. The more forwardly situated steering shaft segment is connected to the steering gear, directly or via another shaft. The steering shaft, together with the parts bearing and supporting the steering shaft, which are connected with the body of the motor vehicle, is conventionally referred to as a steering column. To permit adaptation to the seating position of the driver, such steering columns are frequently implemented such that they are adjustable, wherein the adjustability can include adjustment in length and/or adjustment in height or inclination.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an assembly for equipping a motor vehicle with dual-steer capabilities comprises a first bracket assembly configured to couple a first steering column to the vehicle and a second bracket assembly configured to couple a second steering column to the vehicle. A first gearset is coupled to the first bracket assembly and configured for operative engagement with the first steering column. A second gearset is coupled to the second bracket assembly and configured for operative engagement with the second steering column. A cross shaft operatively couples the first gearset to the second gearset. The first gearset is configured to be operatively coupled to a steering gear of the vehicle. The first bracket assembly is configured to facilitate tilting of an upper steering shaft of the first steering column with respect to a lower steering shaft of the first steering column.

According to one aspect, the first bracket assembly comprises a first bracket subassembly that is positionally fixed with respect to the vehicle and a second bracket subassembly that is movable with respect to the first bracket subassembly and supports the upper steering shaft of the first steering column.

According to one aspect, the first gearset is supported by the first bracket subassembly.

According to one aspect, the assembly further comprises a roller connected to the second bracket subassembly, the roller configured to slide within a slot in the first bracket subassembly as the second bracket subassembly moves with respect to the first bracket subassembly.

According to one aspect, the first gearset is coupled to the steering gear of the vehicle via the lower steering shaft of the first steering column.

According to one aspect, the cross shaft is configured to transfer second steering column steering inputs from the second gearset to the first gearset, and the first gearset is configured to transfer the second steering column steering inputs to the steering gear of the vehicle via the lower steering shaft of the first steering column.

According to one aspect, the cross shaft is configured to transfer first steering column steering inputs from the first gearset to the second gearset, and the second gearset is configured to transfer the first steering column steering inputs to the second steering column.

According to one aspect, the assembly further comprises a longitudinally extensible and retractable first connector shaft operatively coupled to the first gearset. The cross shaft is operatively coupled between the first connector shaft and the second gearset.

According to one aspect, the assembly further comprises a longitudinally extensible and retractable second connector shaft operatively coupled to the second gearset. The cross shaft is operatively coupled between the first and second connector shafts.

According to one aspect, the cross shaft is supported on a firewall of the vehicle.

According to another example of the present disclosure, an assembly for a motor vehicle comprises a first bracket assembly coupling a first steering column to the vehicle in a manner such that at least an upper portion of the first steering column is tiltable with respect to the vehicle. A second bracket assembly couples a second steering column to the vehicle. A first gearset is coupled to the first bracket assembly and operatively coupled to the first steering column to receive first steering column steering inputs. A second gearset is coupled to the second bracket assembly and operatively coupled to the second steering column to receive second steering column steering inputs. A cross shaft is operatively coupled between the first gearset and the second gearset such that second steering column steering inputs to the second gearset are transmitted to the first gearset.

According to one aspect, the first steering column steering inputs to the first gearset are transmitted to the second gearset.

According to one aspect, the second gearset is configured such that the first steering column steering inputs are transmitted from the second gearset to the second steering column.

According to one aspect, the first bracket assembly comprises a first bracket subassembly that is positionally fixed with respect to the vehicle and a second bracket subassembly that is movable with respect to the first bracket subassembly and supports the upper portion of the first steering column.

According to one aspect, the first gearset is supported by the first bracket subassembly.

According to one aspect, the assembly further comprises a roller connected to the second bracket subassembly, the roller configured to slide within a slot in the first bracket subassembly as the second bracket subassembly moves with respect to the first bracket subassembly.

According to one aspect, the assembly further comprises a longitudinally extensible and retractable first connector shaft operatively coupled to the first gearset. The cross shaft is coupled between the first connector shaft and the second gearset.

According to one aspect, the assembly further comprises a longitudinally extensible and retractable second connector shaft operatively coupled to the second gearset. The cross shaft is operatively coupled between the first and second connector shafts.

According to one aspect, the cross shaft is supported on a firewall of the vehicle.

According to one aspect, the first gearset is operatively coupled to a steering gear of the vehicle via a lower portion of the first steering column.

BRIEF DESCRIPTION OF THE DRAWINGS

The present disclosure is described with reference to the following Figures. The same numbers are used throughout the Figures to reference like features and like components.

FIG. 20 shows a rear side of a firewall with the steering columns of FIGS. 14 and 15 installed thereon.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
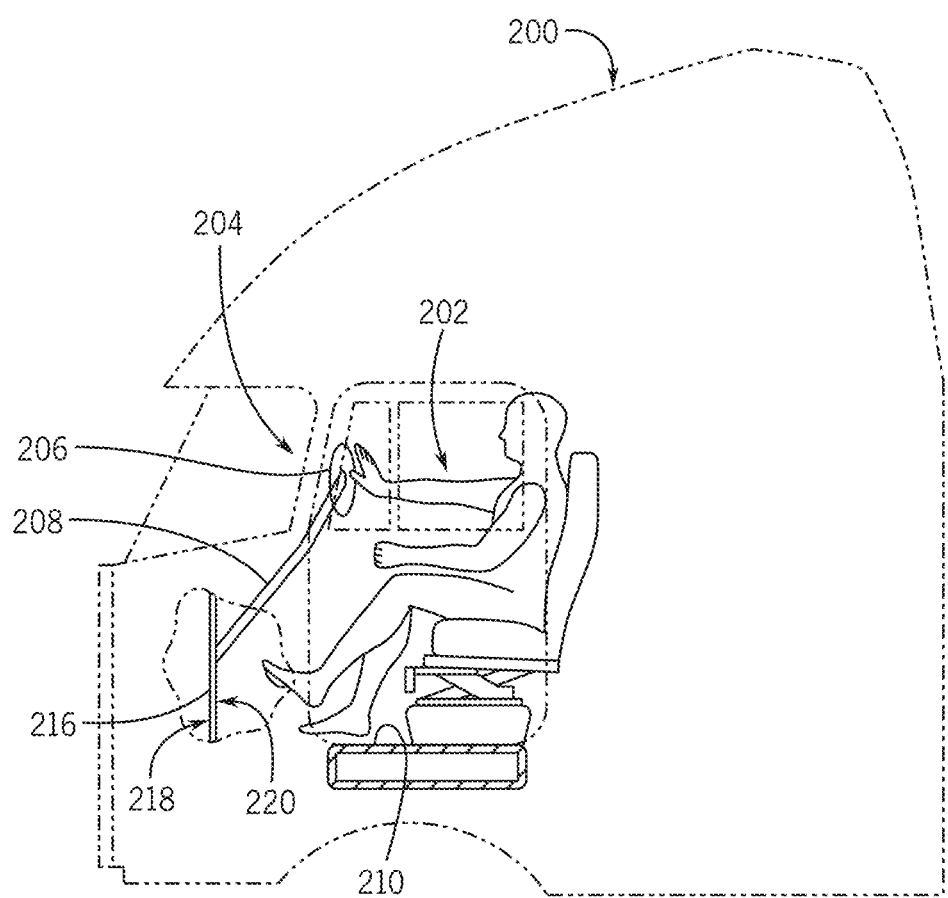
FIG. 1 is a schematic side view of the cab of a motor vehicle.

Referring to FIG. 1, dual driving positions are required in a motor vehicle 200 (e.g., truck) that is used for special purposes (e.g., street sweeping, garbage collection, etc.). The dual driving positions need to be able to actuate the vehicle's brake system, steering system, throttle system, and other related controls from both the driver's side 202 and the passenger's side (on the far side of the driver's side 202) of the vehicle's cab 204. Existing trucks can be retrofitted to provide a dual-driving position on the passenger's side of the cab 204 where one did not previously exist. The assembly of the present disclosure uses a remotely mounted steering column and steering wheel to actuate a vehicle's original equipment manufacturer (OEM) steering gear. The OEM steering wheel 206 and a modified version of the OEM steering column 208 remain in the vehicle's cab 204 and able to actuate the steering gear as well.

Figure 2:
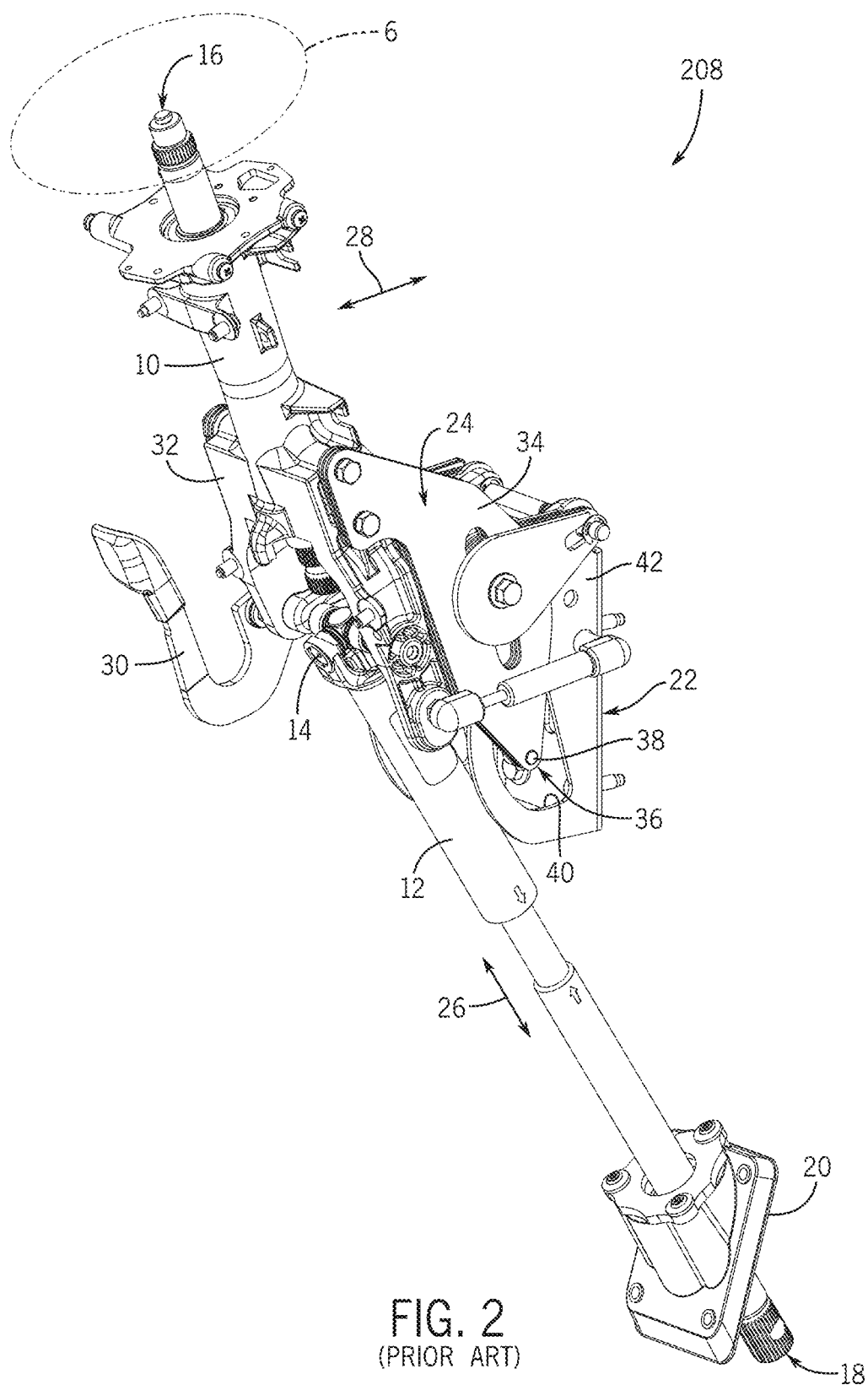
FIG. 2 shows a prior art steering column.

The OEM steering column 208 is shown in FIG. 2. The OEM steering column 208 includes an upper steering shaft 10 and a lower steering shaft 12, which are connected by a U-joint 14. The upper steering shaft 10 is connected at its rearward end 16 to a steering wheel 6 shown in phantom.

The forward end 18 of the lower steering shaft 12 can be directly connected with a steering gear (not shown) or it can be connected via a further universal joint with a further steering shaft segment which, in turn, is connected with the steering gear. The OEM steering column 208 may be supported by the firewall 216 (FIG. 1) of the vehicle 200 directly or by way of a support bar or the like. For example, a lower support 20 can be coupled to the rear face 220 of the firewall 216, the lower steering shaft 12 can extend through a hole in the firewall 216, and the forward end 18 of the lower steering shaft 12 can be situated forward of the front face 218 of the firewall 216. An upper support 22 can be coupled to the rear face 220 of the firewall 216 or to a support bar above the lower support 20. The upper support 22 supports a bracket assembly 24, which in turn supports the upper steering shaft 10 of the OEM steering column 208.

The OEM steering column 208 is adjustable in displacement directions 26 and 28. The displacement direction 26 is parallel to the longitudinal center axis of the lower steering shaft 12 and enables a length adjustment. For this purpose the lower steering shaft 12 comprises two subpieces that are telescopable with respect to one another. In the open state of a securement device 30, the subpieces of the lower steering shaft 12 are displaceable in the displacement direction 26. To adjust the steering column 208 in the displacement direction 28, which represents a height or inclination adjustment of the steering column 208, a swivel bracket 32, in the open state of the securement device 30, is swivellable with respect to the upper support 22. An intermediate bracket 34, which is part of the bracket assembly 24, is capable of movement in both displacement directions 26 and 28. Movement of a lower corner 36 of the intermediate bracket 34 is constrained by a roller 38 that extends through an aperture 40 in a side 42 of the upper support 22.

The set position of the steering column 208 in the closed state of the securement device 30 can be fixed using elements cooperating under friction closure and/or form closure, as is known. To open and close the securement device 30, an actuation lever is used. At least one electrically operated driving means can instead be provided.

Figure 3:
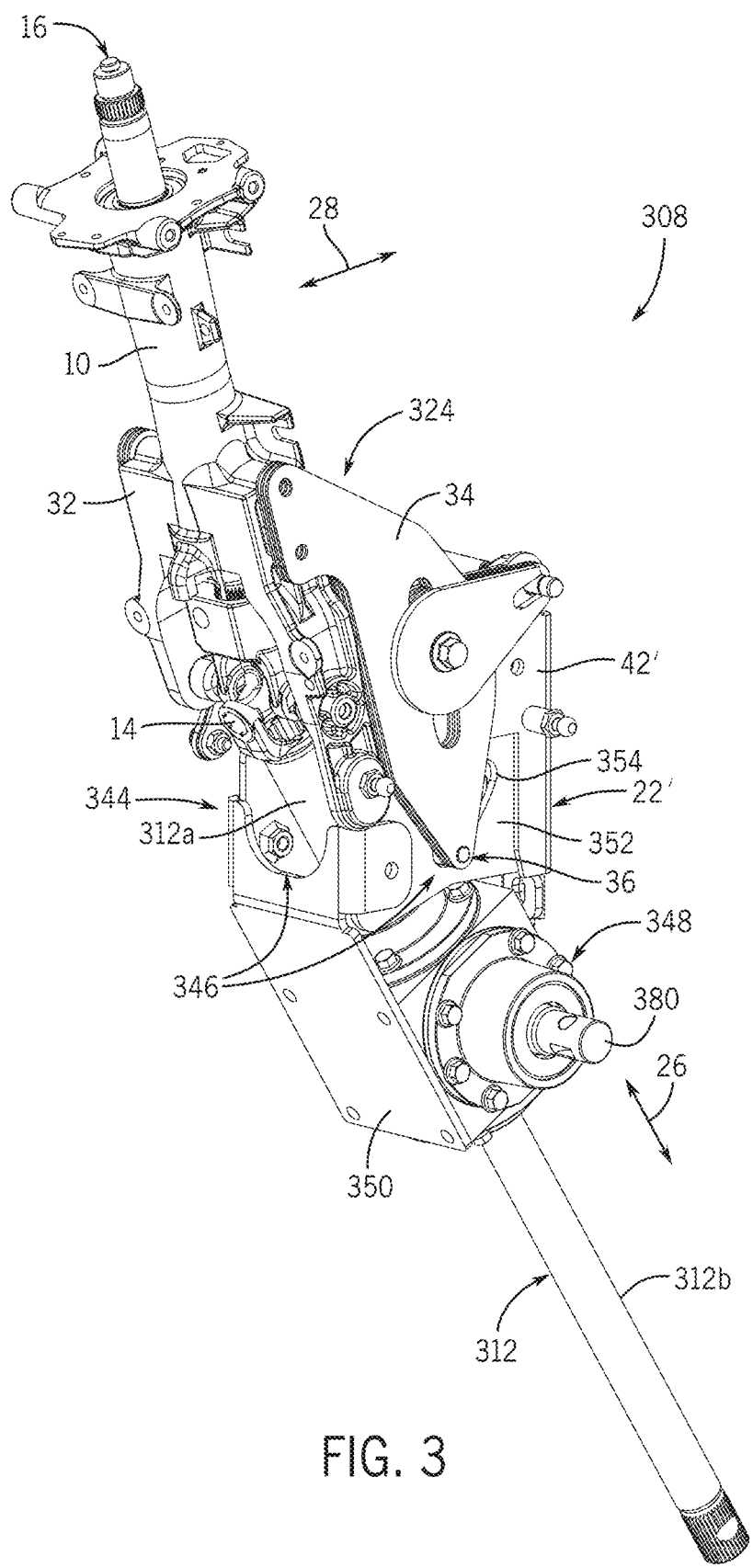
FIG. 3 shows a steering column that is modified from the steering column of FIG. 2.

FIG. 3 illustrates a steering column 308, referred to herein as a first steering column, which is a modified version of the OEM steering column 208 described with respect to FIG. 2. Parts that are the same in both steering columns 208 and 308 are labeled with like reference numbers. A first bracket assembly 344 is coupled to the first steering column 308. The first bracket assembly 344 comprises a first bracket subassembly 346 that is positionally fixed with respect to the vehicle by way of a modified version of the upper support 22'. The first bracket assembly 344 also comprises a second bracket subassembly 324 that is movable with respect to the first bracket subassembly 346 and supports the upper steering shaft 10 of the first steering column 308 by way of the OEM swivel bracket 32. The second bracket subassembly 324 includes the intermediate bracket 34 of the OEM steering column 208. A first gearbox 348 is coupled to the first bracket assembly 344, more specifically to a bent plate 350 that is part of the first bracket subassembly 346. A first portion or segment 312a of the lower steering shaft 312 is located above (on the input side) of the first gearbox 348. A second portion or segment 312b of the lower steering shaft 312 extends downwardly from (i.e., on the output side of) the first gearbox 348.

Figure 4:
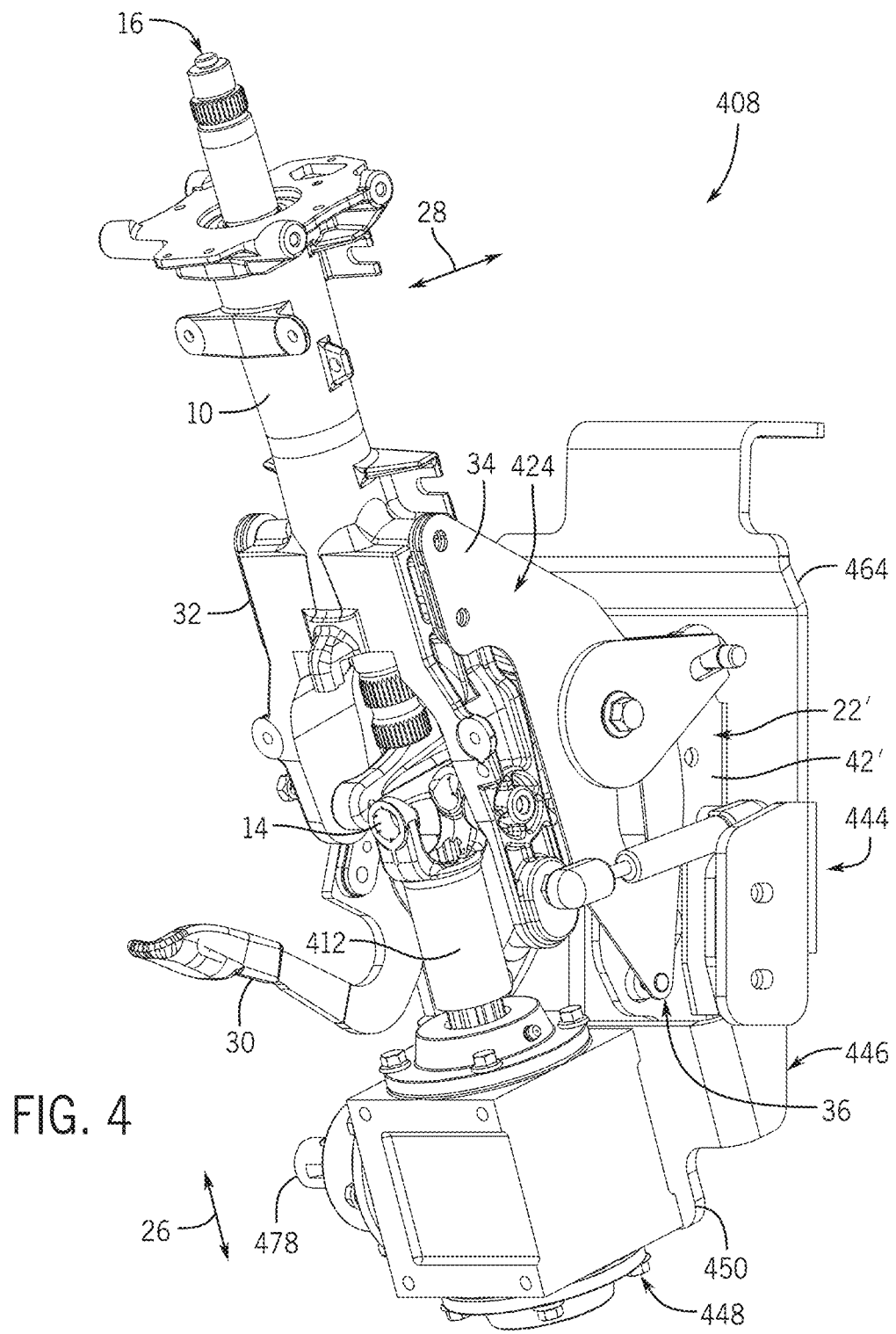
FIG. 4 shows another steering column that is modified from the steering column of FIG. 2.

FIG. 4 illustrates a steering column 408, referred to herein as a second steering column, which is a modified version of the OEM steering column 208 described with respect to FIG. 2. Parts that are the same in both steering columns 208 and 408 are labeled with like reference numbers. A second bracket assembly 444 is coupled to the second steering column 408. The second bracket assembly 444 comprises a third bracket subassembly 446 that is positionally fixed with respect to the vehicle. The second bracket assembly 444 also comprises a fourth bracket subassembly 424 that is movable with respect to the third bracket subassembly 446 and supports the upper steering shaft 10 of the second steering column 408 by way of the OEM swivel bracket 32. The fourth bracket subassembly 424 includes the intermediate bracket 34 of the OEM steering column 208. A second gearbox 448 is coupled to the second bracket assembly 444, more specifically to a bent plate 450 that is part of the third bracket subassembly 446. Unlike in the steering column of FIG. 3, no portion or segment of the lower steering shaft 412 extends downwardly from the gearbox 448. Instead, the lower steering shaft 412 is located only above (on the input side of) the second gearbox 448.

Figure 5:
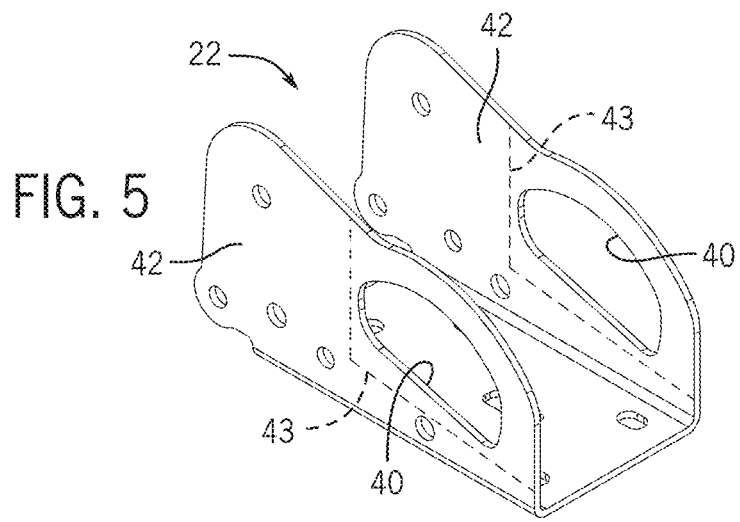
FIG. 5 shows an upper support for the prior art steering column of FIG. 2.
Figure 6:
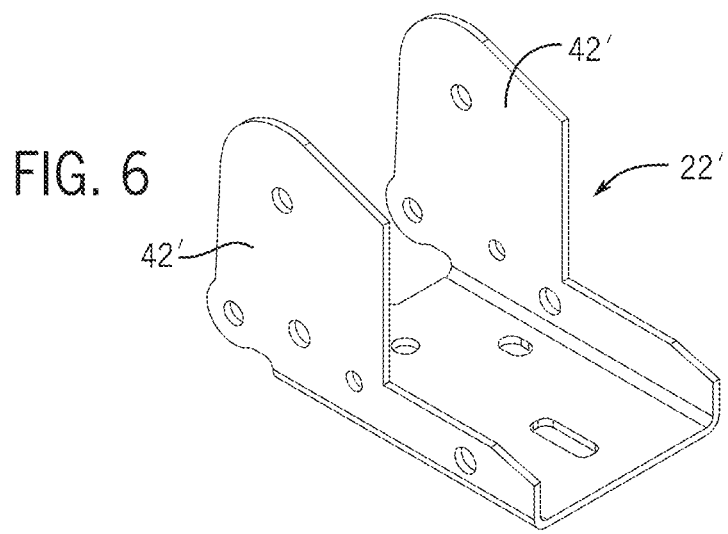
FIG. 6 shows the upper support of FIG. 5 after having been modified to accommodate the first modified steering column of FIG. 3.
Figure 7:
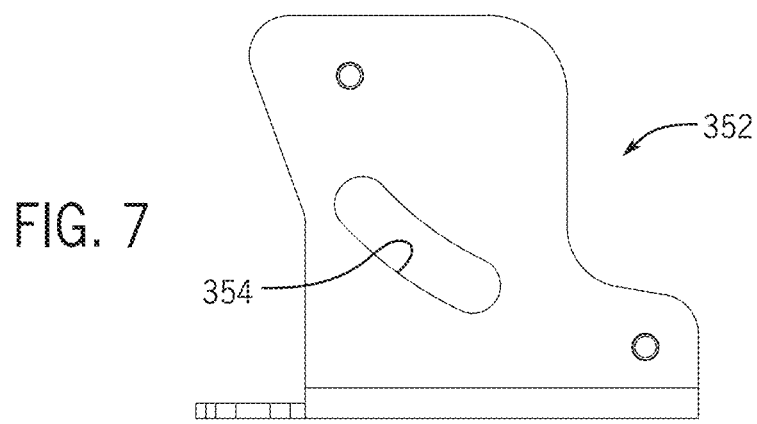
FIG. 7 shows a bracket for connection to the modified upper support of FIG. 6 for use in the modified steering column of FIG. 3.
Figure 8:
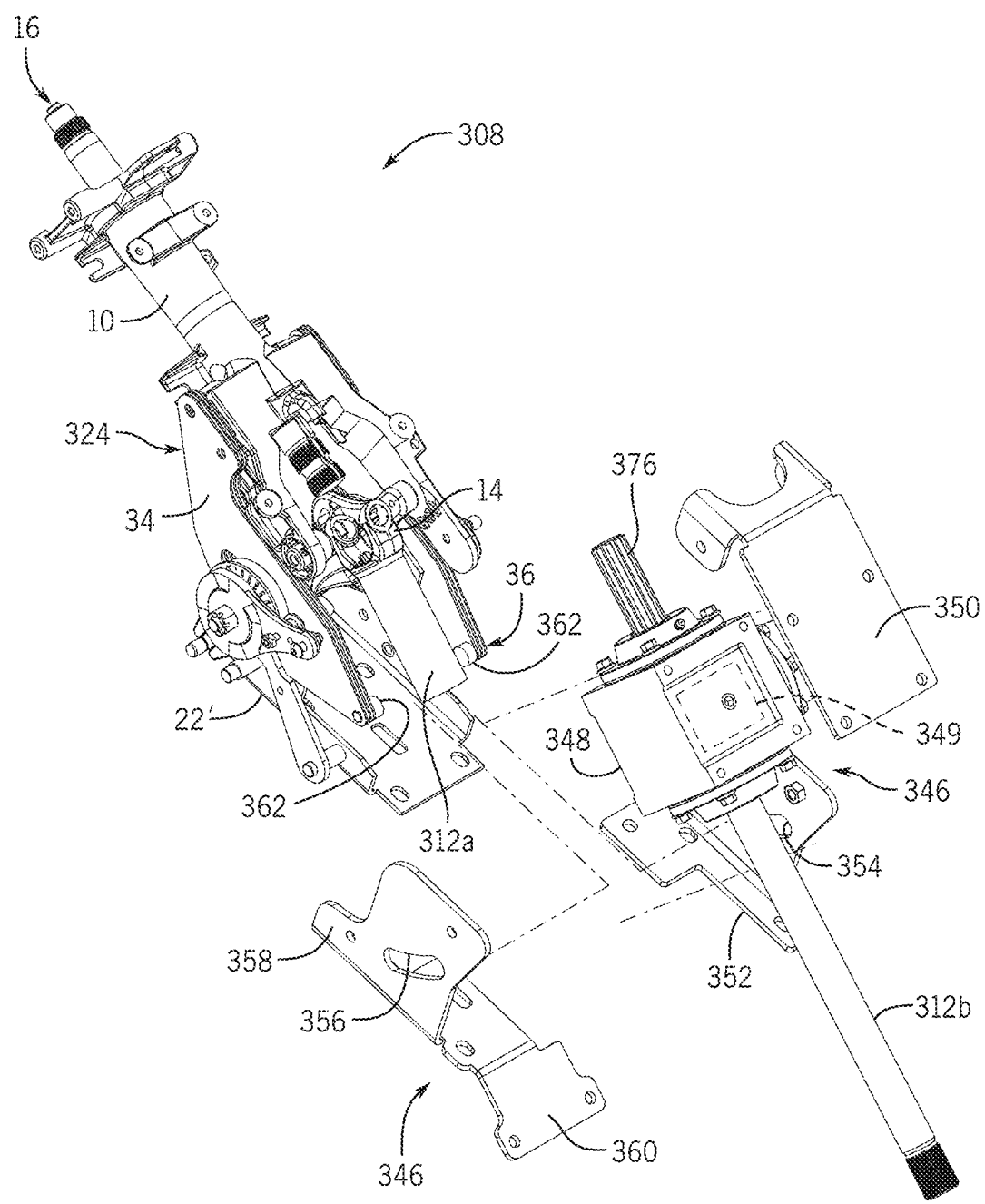
FIG. 8 shows an exploded view of the modified steering column of FIG. 3.

To create the steering column 308 of FIG. 3, the sides 42 of the OEM upper support 22 are first modified. The OEM upper support 22 is shown in isolation in FIG. 5. The OEM upper support 22 is modified by being cut on both sides 42 along the dashed lines 43. The resulting modified OEM upper support 22' with modified sides 42' is shown in FIG. 6. Parts of the first bracket subassembly 346 are then attached to the modified OEM upper support 22' to rebuild both lateral sides 42'. A side view of one of the bent plates 352 of the first bracket subassembly 346 is shown in FIG. 7. It can be seen that an arcuate slot 354 is provided in the side of the bent plate 352. A similar arcuate slot 356 is provided in another bent plate 358 of the first bracket subassembly 346 as shown in FIG. 8. This bent plate 358 also has a downwardly depending portion 360 to which the first gearbox 348 is to be attached. A third bent plate 350 in the first bracket subassembly 346 attaches to the other plates 352, 358 in the first bracket subassembly 346 and also supports the first gearbox 348. The bent plates 350, 352, 358 of the first bracket subassembly 346 can be attached to one another and to the modified OEM upper support 22' by way of bolts, rivets, welding, or other known methods. Preferably, the bent plates 350 and 358 are screwed to the first gearbox 348.

The first bracket assembly 344 (including first bracket subassembly 346 and second bracket subassembly 324) is configured to facilitate tilting of the upper steering shaft 10 of the first steering column 308 with respect to the lower steering shaft 312 of the first steering column 308. To that end, a roller 362 is connected to the second bracket subassembly 324 at the lower corner 36 of the intermediate bracket 34. The roller 362 is configured to slide within the slot 354 in the first bracket subassembly 346 as the second bracket subassembly 324 moves with respect to the first bracket subassembly 346. In the present example, two rollers 362 are provided as shown in FIG. 8, one at the lower corner 36 of each intermediate bracket 34 on either side of the second bracket subassembly 324. One roller 362 rides in arcuate slot 354 and the other roller 362 rides in arcuate slot 356. Thus, the steering column 308 is capable of tilting in the direction 28 (FIG. 3) but is not capable of telescoping in the direction 26. This is because removal of the telescoping OEM lower steering shaft 12 to provide for addition of the gearbox 348 precludes the ability to provide adjustment in direction 26.

Figure 9:
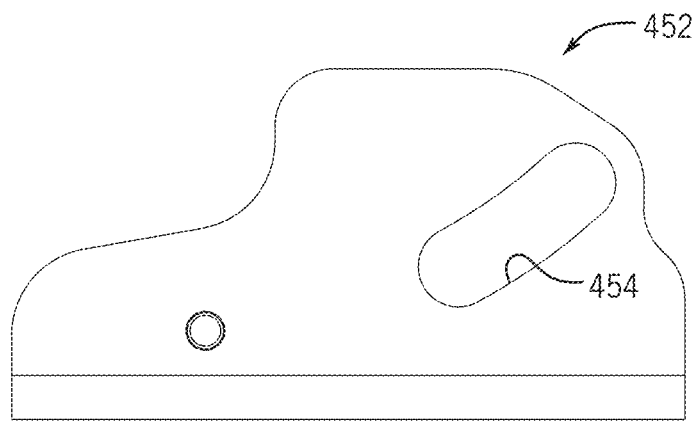
FIG. 9 shows a bracket for connection to the modified upper support of FIG. 6 for use in the modified steering column of FIG. 4.
Figure 10:
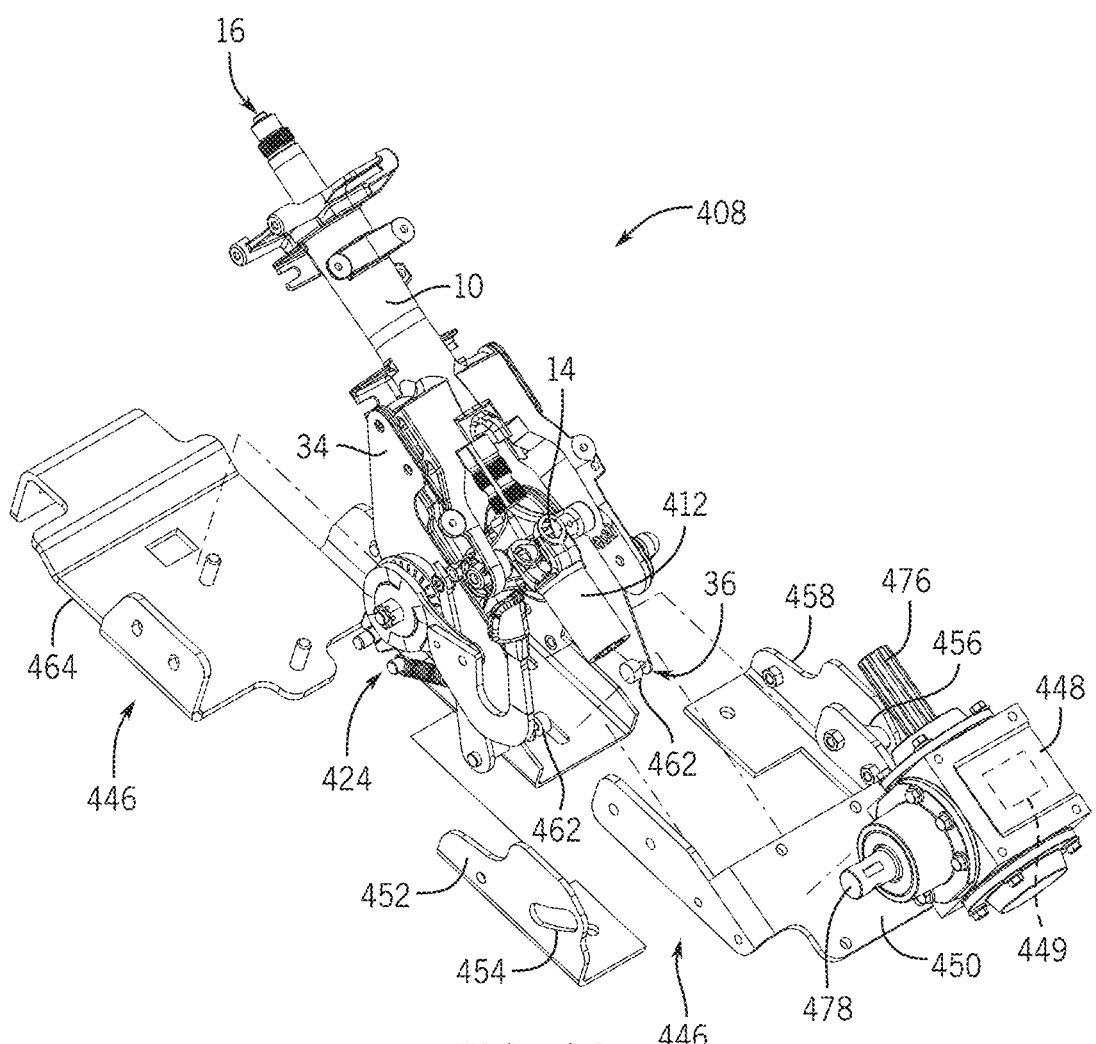
FIG. 10 shows an exploded view of the modified steering column of FIG. 4.

To create the steering column 408 of FIG. 4, the OEM upper support 22 (FIG. 5) is first modified to create the modified OEM upper support 22' (FIG. 6). Parts of the third bracket subassembly 446 are then attached to the modified OEM upper support 22' to rebuild both lateral sides 42'. A side view of one of the bent plates 452 of the third bracket subassembly 446 is shown in FIG. 9. It can be seen that an arcuate slot 454 is provided in the side of the bent plate 452. A similar arcuate slot 456 is provided in another bent plate 458 of the third bracket subassembly 446 as shown in FIG. 10. A third bent plate 450 in the third bracket subassembly 446 attaches to the other bent plates 452, 458 in the third bracket subassembly 446 and supports the second gearbox 448. A fourth bent plate 464 in the third bracket subassembly 446 is configured to be attached to the firewall 216 (FIG. 1) of the vehicle or to a support bar 1170 (FIG. 11) located rearward of the firewall 216. The bent plates 450, 452, 458, 464 of the third bracket subassembly 446 can be attached to one another and to the modified OEM upper support 22' by way of bolts, rivets, welding, or other known methods. Preferably, the bent plate 450 is screwed to the second gearbox 448.

The second bracket assembly 444 (including third bracket subassembly 446 and fourth bracket subassembly 424) is configured to facilitate tilting of an upper steering shaft 10 of the second steering column 408 with respect to a lower steering shaft 412 of the second steering column 408. To that end, a roller 462 is connected to the fourth bracket subassembly 424 at the lower corner 36 of the intermediate bracket 34. The roller 462 is configured to slide within the slot 454 in the third bracket subassembly 446 as the fourth bracket subassembly 424 moves with respect to the third bracket subassembly 446. In the present example, two rollers 462 are provided as shown in FIG. 10, one at the lower corner 36 of each intermediate bracket 34 on either side of the fourth bracket subassembly 424. One roller 462 rides in arcuate slot 454 and the other roller 462 rides in arcuate slot 456. Thus, the steering column 408 is capable of tilting in the direction 28 (FIG. 4) but is not capable of telescoping in the direction 26. This is because removal of the telescoping OEM lower steering shaft 12 to provide for addition of the gearbox 448 precludes the ability to provide adjustment in direction 26.

Figure 11:
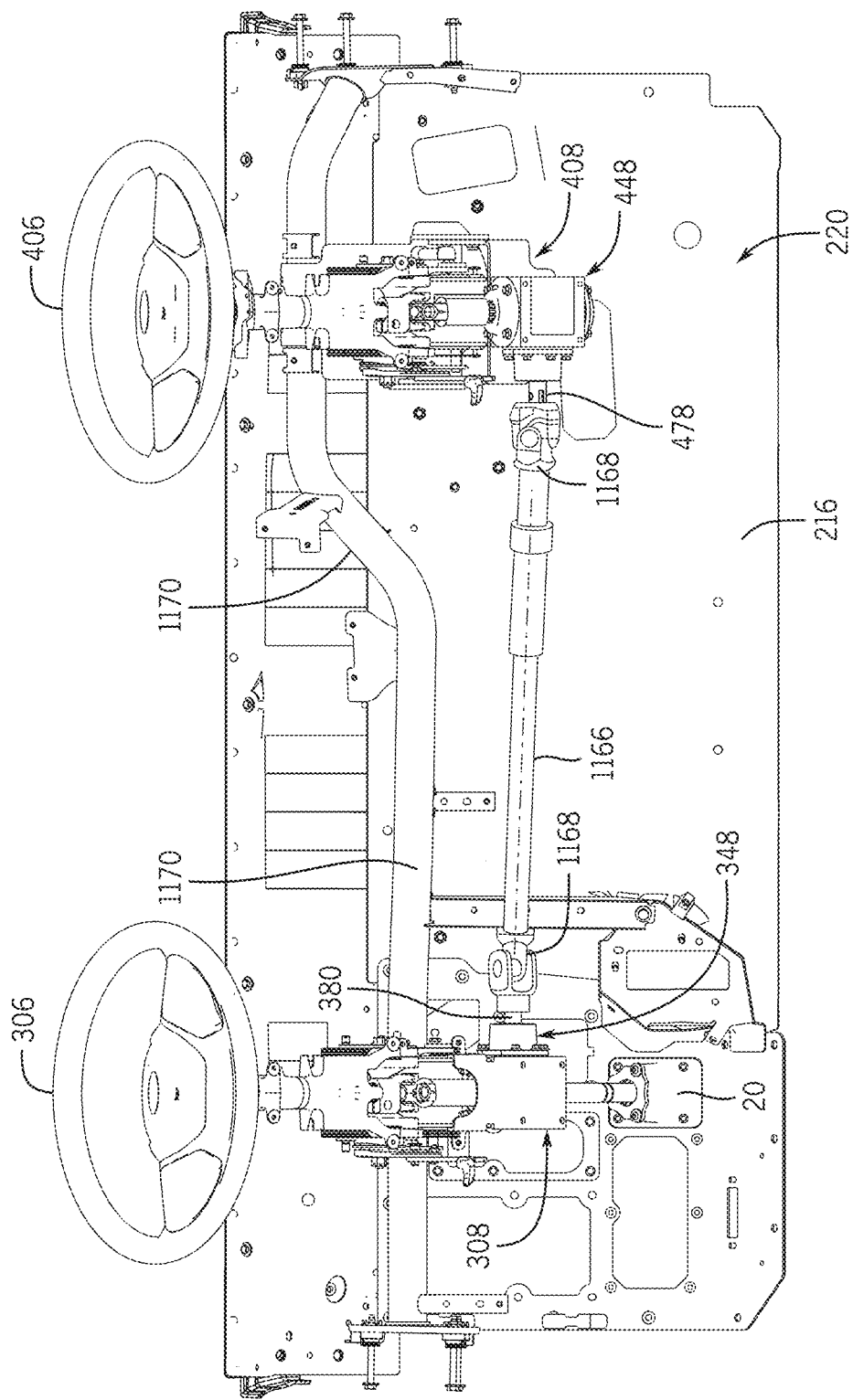
FIG. 11 shows a rear side of a vehicle firewall with the modified steering columns of FIGS. 3 and 4 installed thereon.

FIG. 11 shows the firewall 216 of the vehicle from the rear face 220 (in the driving direction) thereof. It can be seen that a cross shaft 1166 couples the first gearbox 348 to the second gearbox 448. Universal joints 1168 couple the cross shaft 1166 to the gearboxes 348, 448 at either end of the cross shaft 1166. The cross shaft 1166 transfers steering inputs into the second steering column 408 (via the steering wheel 406) from the second gearbox 448 to the first gearbox 348. The first gearbox 348 then transmits those steering inputs to the vehicle's steering gear. Steering inputs can also be input to the first gearbox 348 via the steering wheel 306. The steering wheels 306, 406 are supported by the first and second steering columns 308, 408, respectively, which are in turn supported by an OEM dash support bar 1170.

Referring to FIGS. 8 and 11 together, when the steering wheel 306, which is attached to the rearward end 16 of the upper steering shaft 10, is turned by the operator, this turns the upper steering shaft 10 of the steering column 308. Such steering inputs are transferred to the segment 312a of the lower steering shaft 312 by way of the U-joint 14. The segment 312a of the lower steering shaft 312 is connected to an input shaft 376 of the first gearbox 348. The first gearbox 348 is configured such that rotation of the input shaft 376 rotates an output shaft (not shown). The output shaft is connected to and rotates the segment 312b of the lower steering shaft 312, which is coupled to the steering gear. The first gearbox 348 also has a second input shaft 380 (FIG. 3), rotation of which will rotate the output shaft and thus the segment 312b of the lower steering shaft 312. In one example, the gearbox 348 houses a gearset 349 comprising three intermeshed bevel gears on the respective ends of the input and output shafts, in order to provide for such torque transfer.

Similarly, referring to FIGS. 10 and 11 together, when the steering wheel 406, which is attached to the rearward end 16 of the upper steering shaft 10, is turned by the operator, this turns the upper steering shaft 10 of the second steering column 408. Such steering inputs are transferred to the lower steering shaft 412 by way of the U-joint 14. The lower steering shaft 412 is connected to an input shaft 476 of the second gearbox 448. The second gearbox 448 is configured such that rotation of the input shaft 476 rotates an output shaft 478. In one example, the gearbox 448 houses a gearset 449 comprising two intermeshed bevel gears on the respective ends of the input and output shafts, in order to provide for such torque transfer. The output shaft 478 is connected to the cross shaft 1166 by the U-joint 1168. Rotation of the output shaft 478 of the second gearbox 448 therefore rotates the cross shaft 1166.

The cross shaft 1166 is connected to the input shaft 380 of the first gearbox 348 by another U-joint 1168. Rotation of the cross shaft 1166 rotates the input shaft 380 of the first gearbox 348, which is configured to rotate the output shaft and thus the segment 312b of the lower steering shaft 312. Therefore, steering inputs to both the first and second steering wheels 306, 406 result in rotation of the output shaft of the first gearbox 348 and thus of the segment 312b of the lower steering shaft 312, which is coupled to the steering gear. The gearboxes 348, 448 are configured such that rotation of their input shafts in one direction results in rotation of their output shafts in a given direction (thereby steering the vehicle's wheels in a given direction), and rotation of their input shafts in an opposite direction results in rotation of their output shafts in a direction opposite the given direction (thereby steering the vehicle's wheels in the opposite direction).

Furthermore, rotation of the input shaft 376 of the gearbox 348 results in rotation of the gearbox's input shaft 380, which is transferred to the cross shaft 1166. The cross shaft 1166 rotates the output shaft 478 of the gearbox 448, which rotates its input shaft 476, which rotates lower steering shaft 412, which rotates upper steering shaft 10, which is connected to the steering wheel 416. This way, inputs to the first steering wheel 306 cause the second steering wheel 406 to move correspondingly, such that the second steering wheel 406 is at a position corresponding to the position of the vehicle's wheels. So too do inputs to second steering wheel 406 cause the first steering wheel 306 to turn, via the gearbox 448, output shaft 478, cross shaft 1166, input shaft 380, gearbox 348, input shaft 376, lower steering shaft segment 312a, and upper steering shaft 10.

Figure 12:
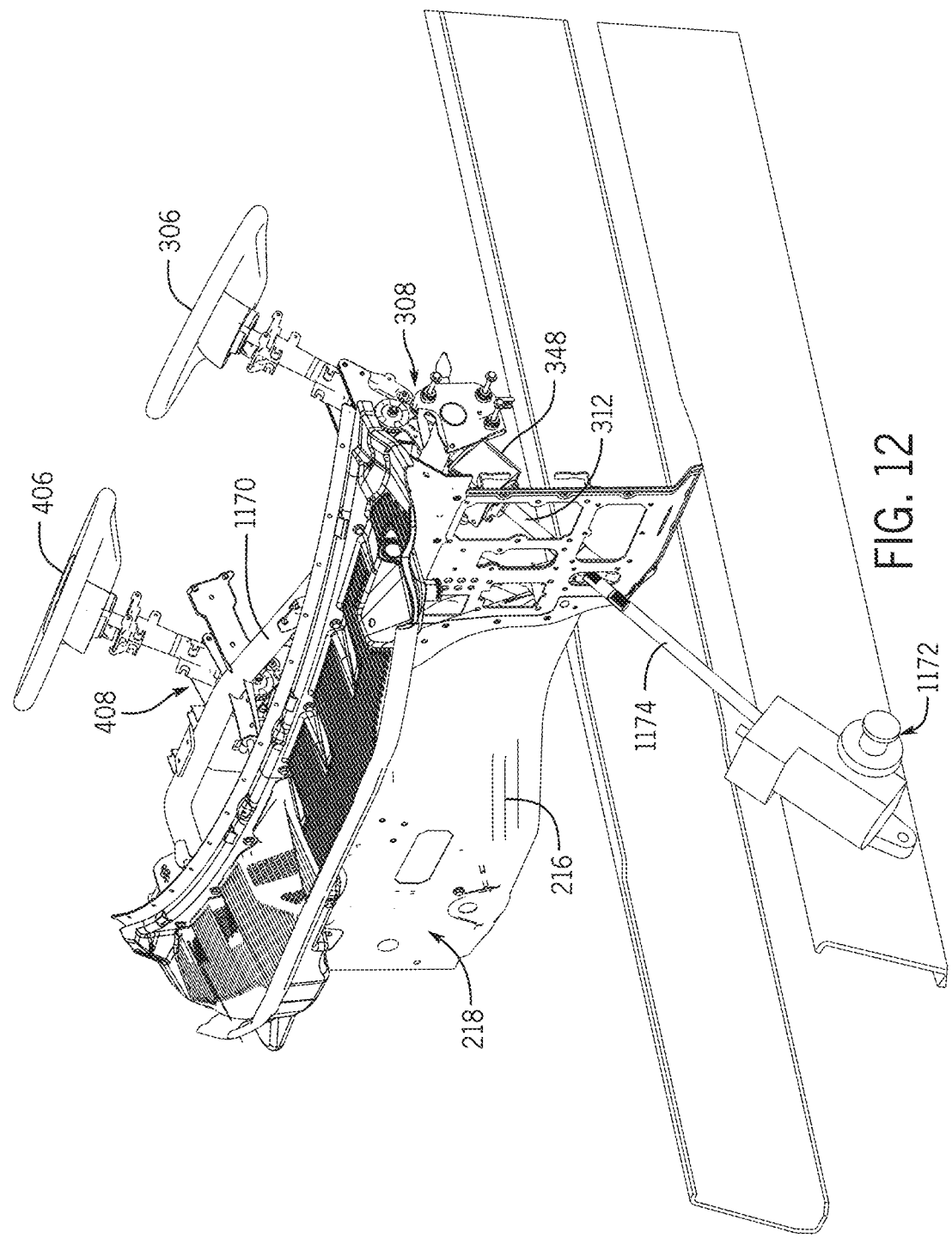
FIG. 12 shows the front side of the firewall and the coupling of the steering column of FIG. 3 to the steering gear of the vehicle.

As shown in FIG. 12, the first gearbox 348 is coupled to a steering gear 1172 of the vehicle via the lower steering shaft 312 of the first steering column 308. The first gearbox 348 transfers the steering inputs from the steering wheels 306, 406 to the steering gear 1172 of the vehicle via the lower steering shaft 312 of the first steering column 308. The lower steering shaft 312 is connected to the steering gear 1172 by way of an extension shaft 1174. In other examples, the lower steering shaft 312 extends all the way to the steering gear 1172. Thus, inputs to both the first and second steering wheels 306, 406 are conveyed to the steering gear 1172 to steer the vehicle's wheels.

The locations of the gearboxes 348, 448 as shown in the present example are as close as possible to the U-joints 14 so as to maximize knee room under the dash. However, the gearboxes 348, 448 could be located elsewhere.

The OEM steering column 208 (modified to become the first steering column 308) is shown on the left hand side of the dash, while the additional (second) steering column 408 is on the right hand side of the dash. Depending on the country for which the vehicle was manufactured, these positions could be reversed.

Figure 13:
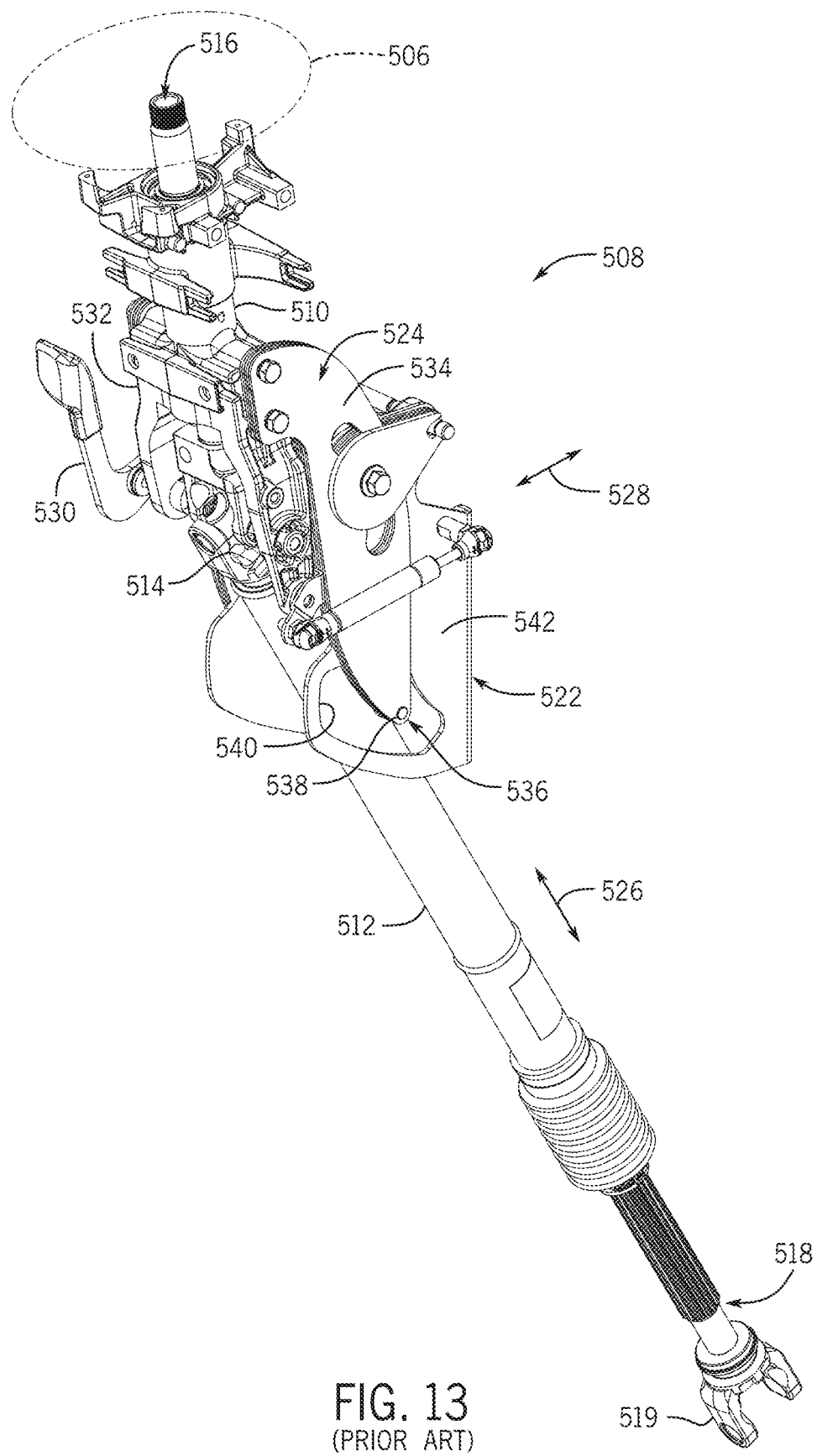
FIG. 13 shows another prior art steering column.

A second example of an OEM steering column 508 is shown in FIG. 13. The OEM steering column 508 includes an upper steering shaft 510 and a lower steering shaft 512, which are connected by a U-joint 514. The upper steering shaft 510 is connected at its rearward end 516 to a steering wheel 506 shown in phantom. The forward end 518 of the lower steering shaft 512 can be directly connected with a vehicle's steering gear (not shown) or it can be connected via a further universal joint 519 with a further steering shaft segment which, in turn, is connected with the steering gear. The OEM steering column 508 may be supported by the firewall 216 (FIG. 1) of the vehicle 200 directly or by way of a support bar, bracket, or the like. For example, the lower steering shaft 512 can extend through a hole in the firewall 216, and the forward end 518 of the lower steering shaft 512 can be situated forward of the front face 218 of the firewall 216. A support 522 can be coupled to the rear face 220 of the firewall 216 or to a support bar or bracket. The support 522 supports a bracket assembly 524, which in turn supports the upper steering shaft 510 of the OEM steering column 508.

The OEM steering column 508 is adjustable in displacement directions 526 and 528. The displacement direction 526 is parallel to the longitudinal center axis of the lower steering shaft 512 and enables a length adjustment. For this purpose the lower steering shaft 512 comprises two subpieces that are telescopable with respect to one another. In the open state of a securement device 530, the subpieces of the lower steering shaft 512 are displaceable in the displacement direction 526. To adjust the steering column 508 in the displacement direction 528, which represents a height or inclination adjustment of the steering column 508, a swivel bracket 532, in the open state of the securement device 530, is swivellable with respect to the support 522. An intermediate bracket 534, which is part of the bracket assembly 524, is capable of movement in both displacement directions 526 and 528. Movement of a lower corner 536 of the intermediate bracket 534 is constrained by a roller 538 that extends through an aperture 540 in a side 542 of the support 522.

The set position of the steering column 508 in the closed state of the securement device 530 can be fixed using elements cooperating under friction closure and/or form closure, as is known. To open and close the securement device 530, an actuation lever is used. At least one electrically operated driving means can instead be provided.

Figure 14:
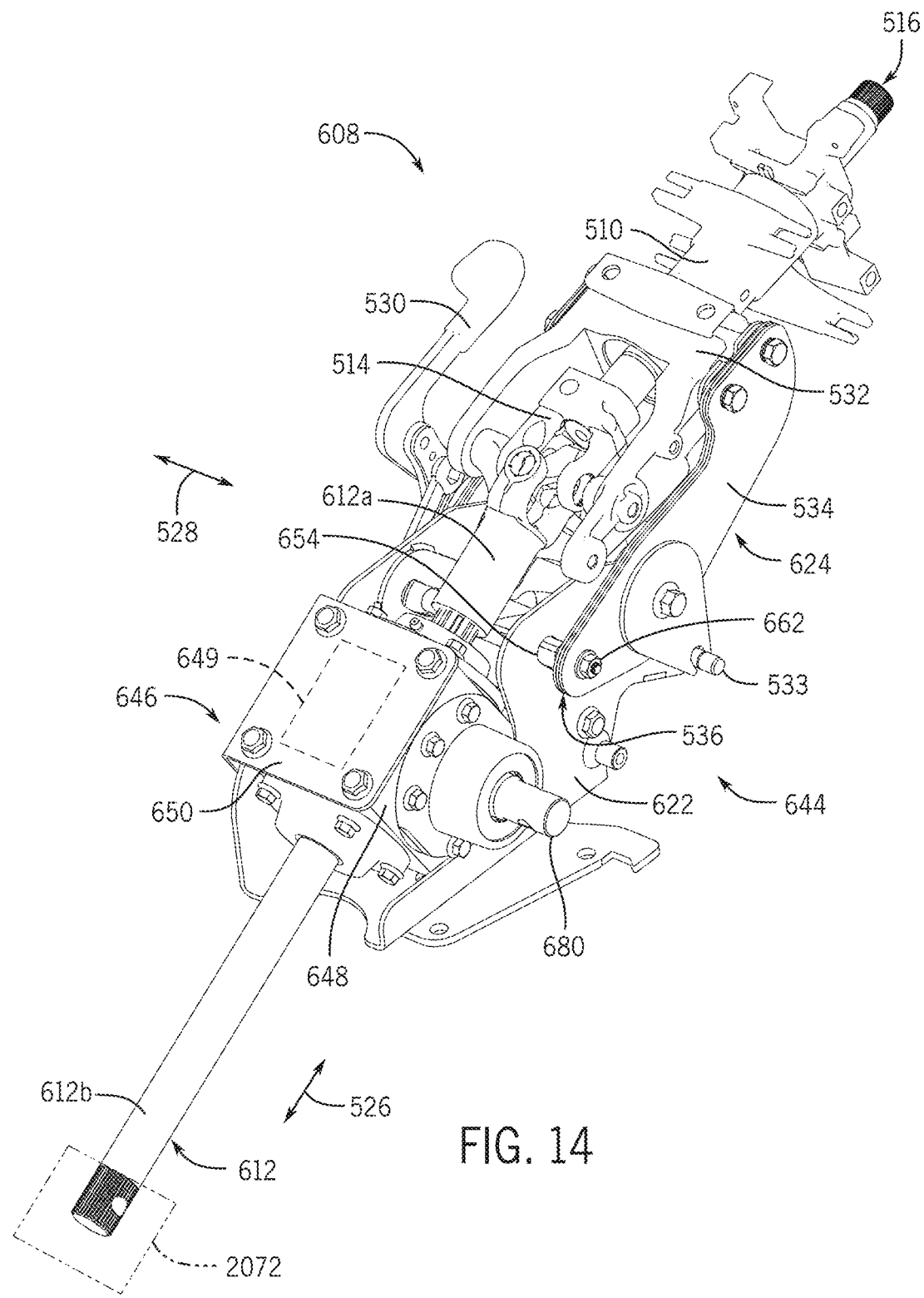
FIG. 14 shows a steering column that is modified from the steering column of FIG. 13.

FIG. 14 illustrates a steering column 608, referred to herein as a first steering column, which is a modified version of the OEM steering column 508 described with respect to FIG. 13. Parts that are the same in both steering columns 508 and 608 are labeled with like reference numbers. A first bracket assembly 644 is coupled to the first steering column 608. The first bracket assembly 644 comprises a first bracket subassembly 646 that is positionally fixed with respect to the vehicle by way of a support 622. The first bracket assembly 644 also comprises a second bracket subassembly 624 that is movable with respect to the first bracket subassembly 646 and supports the upper steering shaft 510 of the first steering column 608 by way of the OEM swivel bracket 532. The second bracket subassembly 624 includes the intermediate bracket 534 of the OEM steering column 508. A first gearbox 648 (containing first gearset 649) is coupled to the first bracket assembly 644, more specifically to a bent plate 650 that is part of the first bracket subassembly 646. A first portion or segment 612a of the lower steering shaft 612 is located above (on the input side) of the first gearbox 648. A second portion or segment 612b of the lower steering shaft 612 extends downwardly from (i.e., on the output side of) the first gearbox 648.

Figure 15:
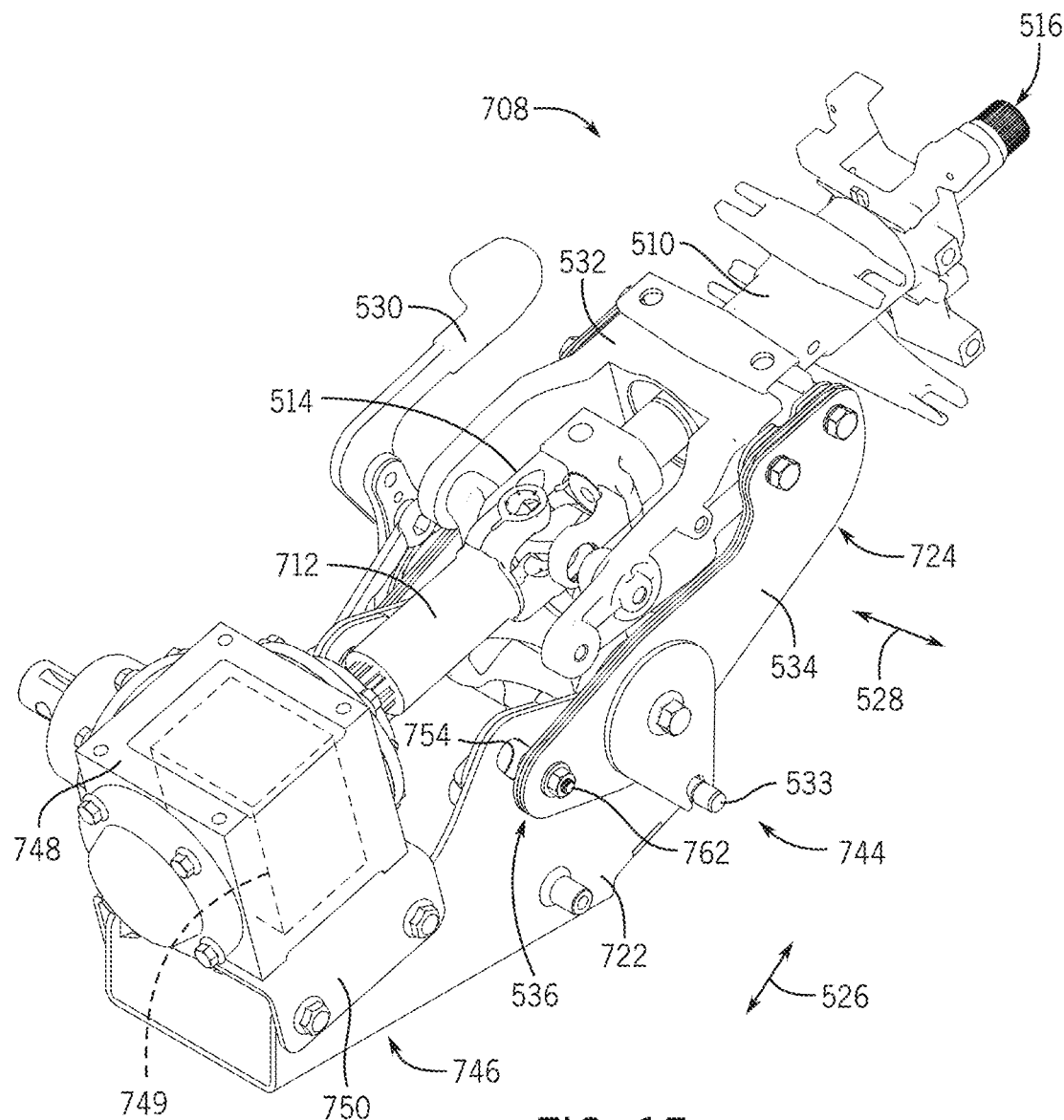
FIG. 15 shows another steering column that is modified from the steering column of FIG. 13.

FIG. 15 illustrates a steering column 708, referred to herein as a second steering column, which may also be a modified version of the OEM steering column 508 described with respect to FIG. 13. Parts that are the same in both steering columns 508 and 708 are labeled with like reference numbers. A second bracket assembly 744 is coupled to the second steering column 708. The second bracket assembly 744 comprises a third bracket subassembly 746 that is positionally fixed with respect to the vehicle by way of a support 722. The second bracket assembly 744 also comprises a fourth bracket subassembly 724 that is movable with respect to the third bracket subassembly 746 and supports the upper steering shaft 510 of the second steering column 708 by way of the OEM swivel bracket 532. The fourth bracket subassembly 724 includes the intermediate bracket 534 of the OEM steering column 508. A second gearbox 748 (including second gearset 749) is coupled to the second bracket assembly 744, more specifically to a bent plate 750 that is part of the third bracket subassembly 746. Unlike in the steering column of FIG. 14, no portion or segment of the lower steering shaft 712 extends downwardly from the gearbox 748. Instead, the lower steering shaft 712 is located only above (on the input side of) the second gearbox 748.

Figure 16:
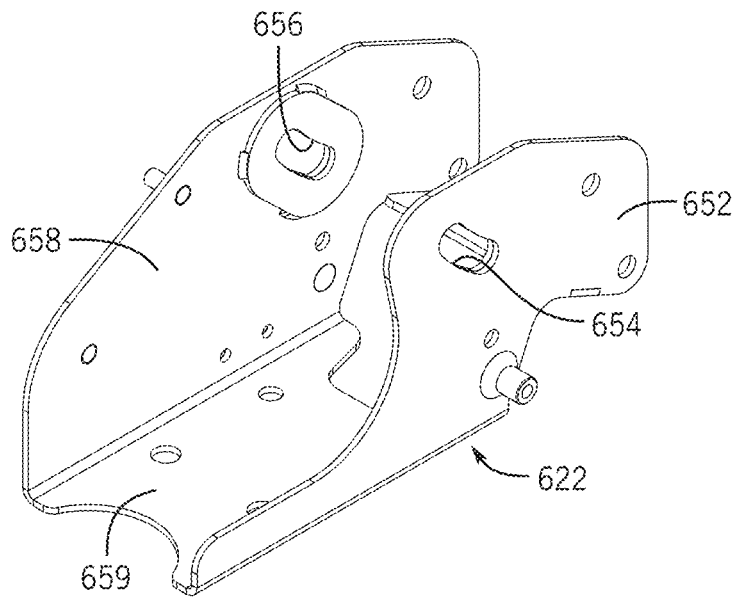
FIG. 16 shows a support for the steering column of FIG. 14.

The support 622 of the first bracket subassembly 646 is shown in isolation FIG. 16, which support 622 is part of the steering column 608 of FIG. 14. An arcuate slot 654 is provided in the sidewall 652 of the support 622. A similar arcuate slot 656 is provided in an opposing sidewall 658 of the support 622. The opposing sidewalls 652, 658 of the support 622 are connected by a base 659, to which the first gearbox 648 is to be attached. Now referring to FIG. 18, a bent plate 650 in the first bracket subassembly 646 attaches to the sidewall 658 of the support 622 and also to the first gearbox 648. The bent plate 650 and the support 622 of the first bracket subassembly 646 can be attached to one another by way of bolts, rivets, welding, or other known methods. Preferably, the bent plate 650 and the support 622 are screwed to the first gearbox 648.

Figure 18:
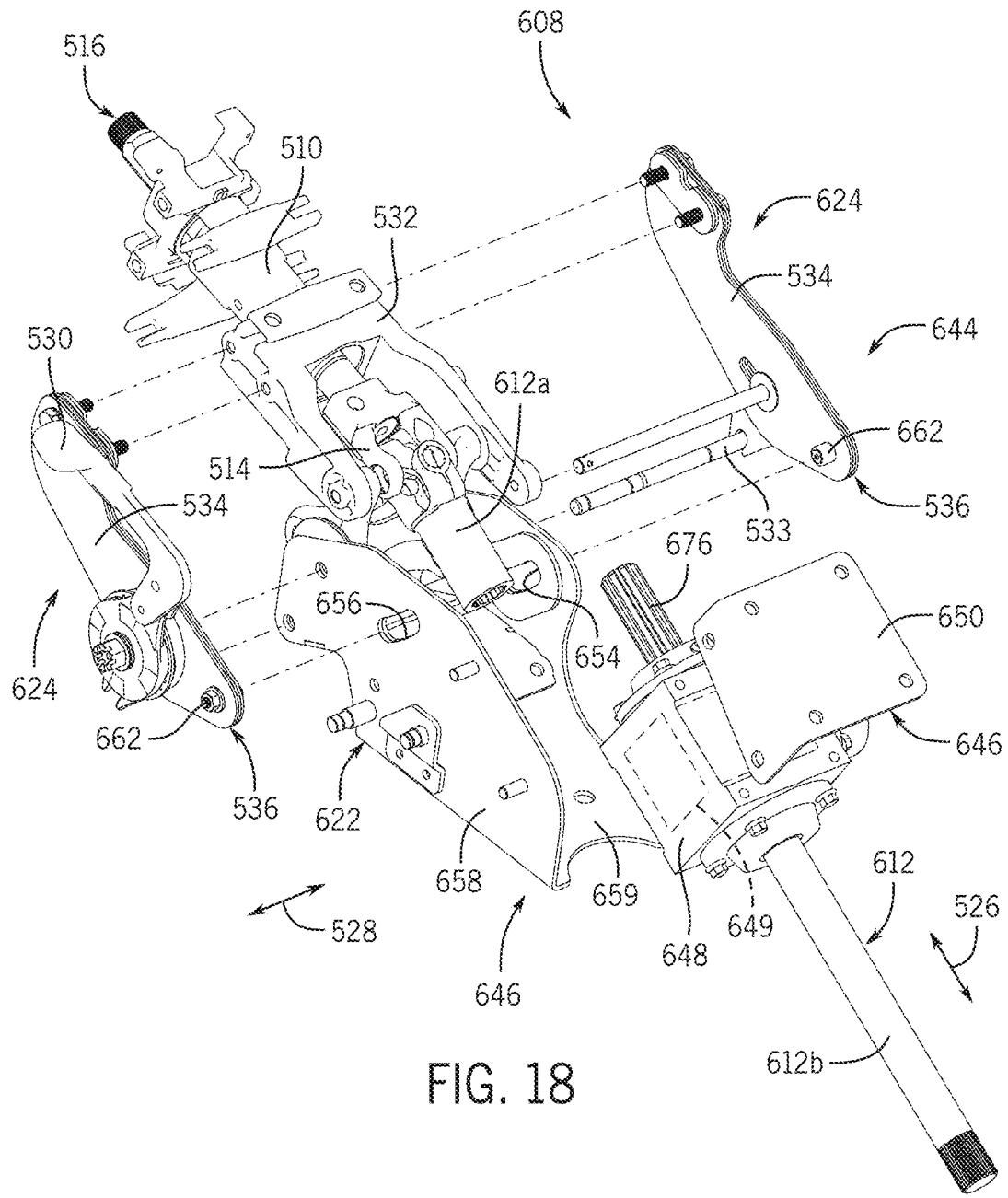
FIG. 18 shows an exploded view of the steering column of FIG. 14.

Still referring to FIG. 18 and now also to FIGS. 14 and 16, the first bracket assembly 644 (including first bracket subassembly 646 and second bracket subassembly 624) is configured to facilitate tilting of the upper steering shaft 510 of the first steering column 608 with respect to the lower steering shaft 612 of the first steering column 608, as the second bracket subassembly 624 pivots on pivot rod 533 with respect to the first bracket subassembly 646. To that end, a roller 662 is connected to the second bracket subassembly 624 at the lower corner 536 of the intermediate bracket 534. The roller 662 is configured to slide within the slot 654 in the first bracket subassembly 646 as the second bracket subassembly 624 moves with respect to the first bracket subassembly 646. In the present example, two rollers 662 are provided as shown in FIG. 18, one at the lower corner 536 of each intermediate bracket 534 on either side of the second bracket subassembly 624. One roller 662 rides in arcuate slot 654 and the other roller 662 rides in arcuate slot 656. Thus, the steering column 608 is capable of tilting in the direction 528 but is not capable of telescoping in the direction 526. This is because removal of the telescoping OEM lower steering shaft 512 to provide for addition of the gearbox 648 precludes the ability to provide adjustment in direction 526.

Figure 17:
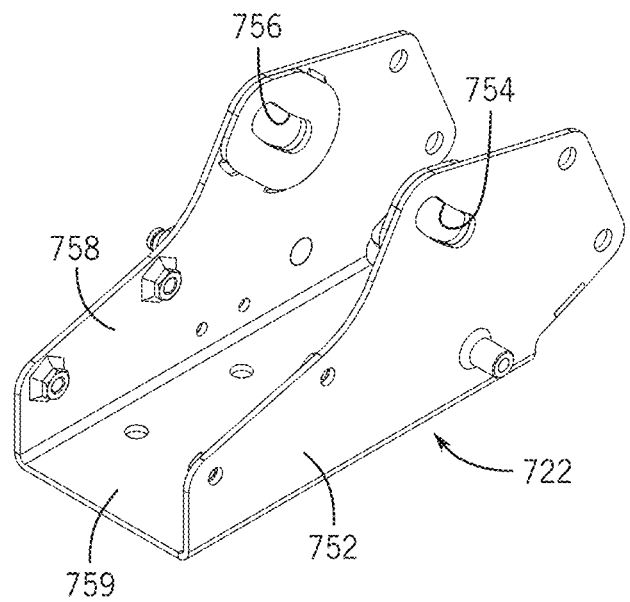
FIG. 17 shows a support for the steering column of FIG. 15.
Figure 19:
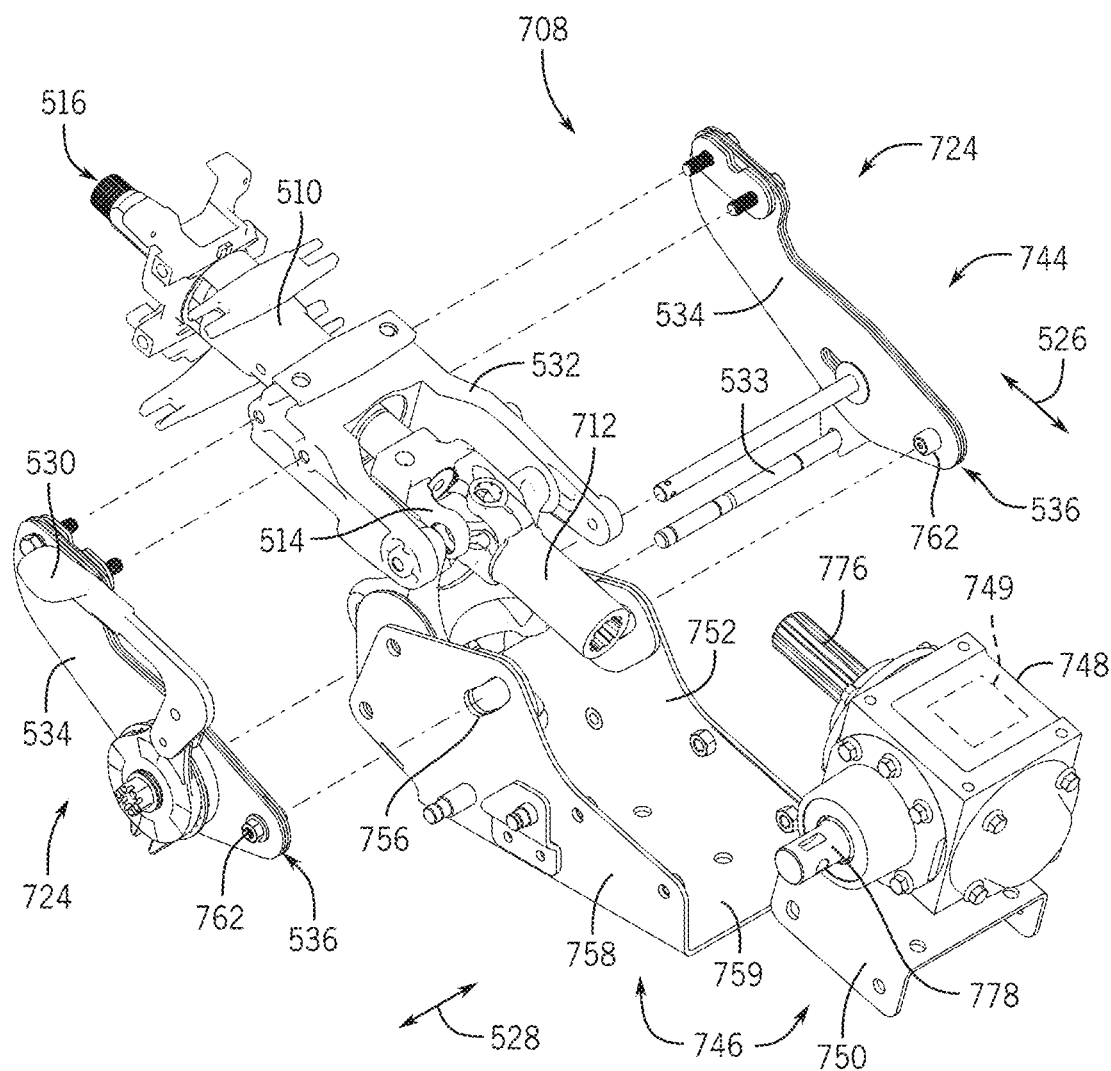
FIG. 19 shows an exploded view of the steering column of FIG. 15.

The support 722 of the third bracket subassembly 746 is shown in isolation FIG. 17, which support 722 is part of the steering column 708 of FIG. 15. An arcuate slot 754 is provided in the sidewall 752 of the support 722. A similar arcuate slot 756 is provided in an opposing sidewall 758 of the support 722. A base 759 connects the two sidewalls 752, 758. As shown in FIG. 19, a bent plate 750 of the third bracket subassembly 746 attaches to the sidewalls 752, 758 of the support 722 and supports the second gearbox 748. The bent plate 750 and the support 722 of the third bracket subassembly 746 can be attached to one another by way of bolts, rivets, welding, or other known methods. Preferably, the bent plate 750 and the support 722 are screwed to the second gearbox 748.

Referring to FIGS. 15, 17, and 19, the second bracket assembly 744 (including third bracket subassembly 746 and fourth bracket subassembly 724) is configured to facilitate tilting of an upper steering shaft 510 of the second steering column 708 with respect to a lower steering shaft 712 of the second steering column 708, as the fourth bracket subassembly 724 pivots on pivot rod 533 with respect to the third bracket subassembly 746. To that end, a roller 762 is connected to the fourth bracket subassembly 724 at the lower corner 536 of the intermediate bracket 534. The roller 762 is configured to slide within the slot 754 in the third bracket subassembly 746 as the fourth bracket subassembly 724 moves with respect to the third bracket subassembly 746. In the present example, two rollers 762 are provided as shown in FIG. 19, one at the lower corner 536 of each intermediate bracket 534 on either side of the fourth bracket subassembly 724. One roller 762 rides in arcuate slot 754 and the other roller 762 rides in arcuate slot 756. Thus, the steering column 708 is capable of tilting in the direction 528 but is not capable of telescoping in the direction 526. This is because removal of the telescoping OEM lower steering shaft 512 to provide for addition of the gearbox 748 precludes the ability to provide adjustment in direction 526.

Figure 20A:
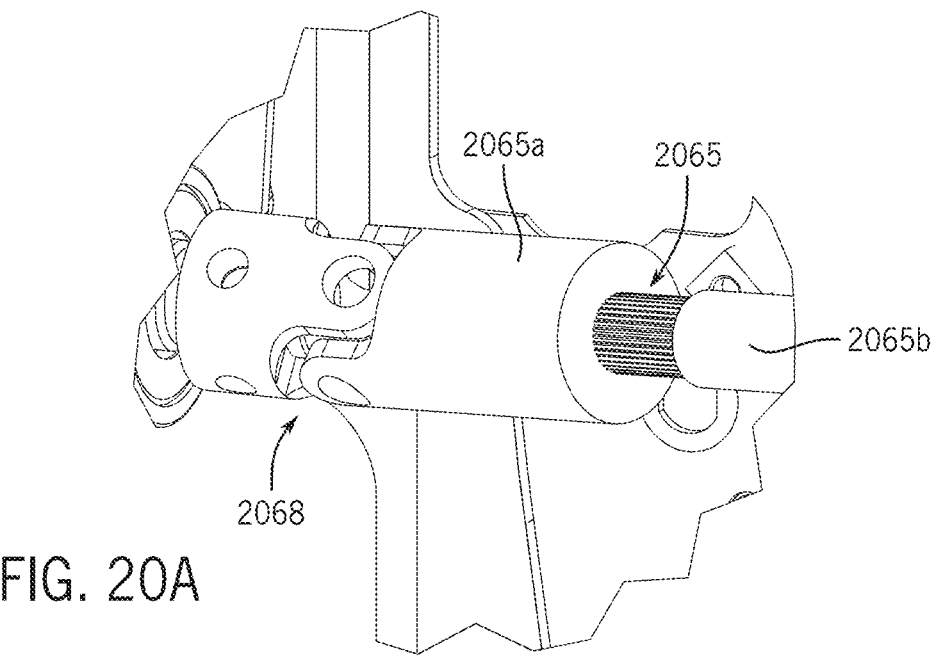
FIGS. 20A and 20B show detailed views of portions of FIG. 20.
Figure 20B:
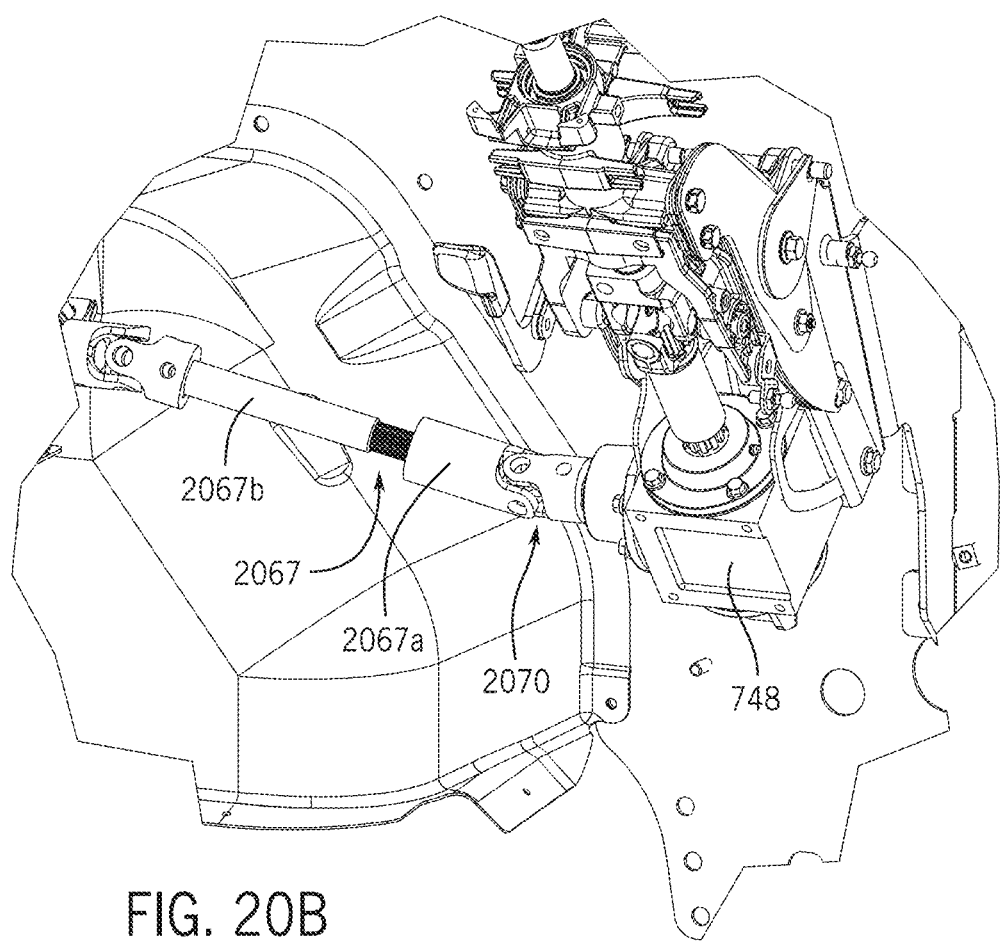

FIG. 20 shows a firewall 2016 of a vehicle from the rear face 2020 (in the driving direction) thereof. First steering column 608 is coupled to the firewall 2016 by a support bracket 2074 and second steering column 708 is coupled to the firewall 2016 by a support bracket 2076. It can be seen that a series of shafts 2065, 2066, 2067 couples the first gearbox 648 to the second gearbox 748. Universal joint 2068 couples the shaft 2065 to the gearbox 648, universal joint 2070 couples the shaft 2067 to the gearbox 748, and universal joints 2080 couple opposing ends of cross shaft 2066 to connector shafts 2065 and 2067. The cross shaft 2066 is supported on the firewall 2016 of the vehicle by way of a pair of brackets 2078 comprising journal bearings that are attached to the firewall 2016. FIG. 20A shows a detailed view of a portion of FIG. 20, where the U-joint 2068 connects the shaft 2065 to the first gearbox 648. The shaft 2065 is made up of a first larger diameter part 2065*a* that is splined to a second smaller diameter part 2065*b*. This splined connection makes the shaft 2065 longitudinally extensible and retractable so as to case installation of the cross shaft assembly (comprising shafts 2065, 2066, 2067, and U-joints 2068, 2070, 2080) between the two steering columns 608, 708. FIG. 20B shows a detailed view of a portion of FIG. 20, where the U-joint 2070 connects the shaft 2067 to the second gearbox 748. The shaft 2067 is made up of a first larger diameter part 2067*a* that is splined to a second smaller diameter part 2067*b*. This splined connection makes the shaft 2067 longitudinally extensible and retractable so as to case installation of the cross shaft assembly between the two steering columns 608, 708.

The series of shafts 2065, 2066, 2067 transfers steering inputs into the second steering column 708 (input via the steering wheel connected thereto) from the second gearbox 748 to the first gearbox 648. The first gearbox 648 then transmits those steering inputs to the vehicle's steering gear 2072 (FIG. 14). Steering inputs can also be input to the first gearbox 648 via a steering wheel (not shown) connected to the first steering column 608. Such operation is described below.

Referring to FIGS. 18 and 20 together, when a steering wheel (not shown) attached to the rearward end 516 of the upper steering shaft 510 of the steering column 608 is turned by the operator, this turns the upper steering shaft 510 of the steering column 608. Such steering inputs are transferred to the segment 612*a* of the lower steering shaft 612 by way of the U-joint 514. The segment 612*a* of the lower steering shaft 612 is connected to an input shaft 676 of the first gearbox 648. The first gearbox 648 is configured such that rotation of the input shaft 676 rotates an output shaft (not shown). The output shaft is connected to and rotates the segment 612*b* of the lower steering shaft 612, which is coupled to the vehicle's steering gear 2072. The first gearbox 648 also has a second input shaft 680 (FIG. 14), rotation of which will rotate the output shaft and thus the segment 612*b* of the lower steering shaft 612. In one example, the gearbox 648 houses a gearset 649 comprising three intermeshed bevel gears on the respective ends of the input and output shafts, in order to provide for such torque transfer.

Similarly, referring to FIGS. 19 and 20 together, when a steering wheel (not shown) attached to the rearward end 516 of the upper steering shaft 510 of the steering column 708 is turned by the operator, this turns the upper steering shaft 510 of the second steering column 708. Such steering inputs are transferred to the lower steering shaft 712 by way of the U-joint 514. The lower steering shaft 712 is connected to an input shaft 776 of the second gearbox 748. The second gearbox 748 is configured such that rotation of the input shaft 776 rotates an output shaft 778. In one example, the gearbox 748 houses a gearset 749 comprising two intermeshed bevel gears on the respective ends of the input and output shafts, in order to provide for such torque transfer. The output shaft 778 is connected to the shaft 2067 of the cross shaft assembly by the U-joint 2070. Rotation of the output shaft 778 of the second gearbox 748 therefore rotates the shaft 2067.

The shaft 2067 is coupled to the input shaft 680 of the first gearbox 648 by U-joint 2080, cross shaft 2066, another U-joint 2080, shaft 2065, and U-joint 2068. Rotation of the shafts 2067, 2066, 2065 rotates the input shaft 680 of the first gearbox 648, which is configured to rotate the output shaft and thus the segment 612*b* of the lower steering shaft 612. Therefore, steering inputs to both the first and second steering columns 608, 708 result in rotation of the output shaft of the first gearbox 648 and thus of the segment 612*b* of the lower steering shaft 612, which is coupled to the vehicle's steering gear 2072. The gearboxes 648, 748 are configured such that rotation of their input shafts in one direction results in rotation of their output shafts in a given direction (thereby steering the vehicle's wheels in a given direction), and rotation of their input shafts in an opposite direction results in rotation of their output shafts in a direction opposite the given direction (thereby steering the vehicle's wheels in the opposite direction).

Furthermore, rotation of the input shaft 676 of the gearbox 648 results in rotation of the first gearbox's input shaft 680, which is transferred to the shaft 2065. Rotation of the shaft 2065 rotates the shafts 2066 and 2067, the latter of which rotates the output shaft 778 of the gearbox 748, which rotates its input shaft 776, which rotates lower steering shaft 712, which rotates upper steering shaft 510, which is connected to a steering wheel. This way, inputs to the first steering column 608 cause the second steering column 708 to move correspondingly, such that the steering wheel on the second steering column 708 is at a position corresponding to the position of the vehicle's wheels. So too do inputs to the steering wheel on the second steering column 708 cause the steering wheel attached to the first steering column 608 to turn, via the gearbox 748, output shaft 778, shafts 2067, 2066, 2065, input shaft 680, gearbox 648, input shaft 676, lower steering shaft segment 612*a*, and upper steering shaft 510.

The first gearbox 648 is coupled to a steering gear 2072 of the vehicle via the lower steering shaft 612 of the first steering column 608, more specifically via the lower segment 612*b*. The first gearbox 648 transfers the steering inputs from the steering wheels to the steering gear 2072 of the vehicle via the lower steering shaft 612 of the first steering column 608. The lower steering shaft 612 may be coupled to the vehicle's steering gear 2072 by way of a U-joint 519, such as that shown in FIG. 13, or in a manner like that shown in FIG. 12. In other examples, the lower steering shaft 612 extends all the way to the vehicle's steering gear 2072. Thus, inputs to both the first and second steering wheels on the respective first and second steering columns 608, 708 are conveyed to the steering gear 2072 to steer the vehicle's wheels.

The locations of the gearboxes 648, 748 as shown in the present example are as close as possible to the U-joints 514 so as to maximize knee room under the dash. However, the gearboxes 648, 748 could be located elsewhere.

In FIG. 20, the OEM steering column 508 (modified to become the first steering column 608) is shown on the left hand side of the dash, while the additional (second) steering column 708 is on the right hand side of the dash. Depending on the country for which the vehicle was manufactured, these positions could be reversed.

According to one example of the present disclosure, an assembly for equipping a motor vehicle with dual-steer capabilities comprises a first bracket assembly 344, 644 configured to couple a first steering column 308, 608 to the vehicle and a second bracket assembly 444, 744 configured to couple a second steering column 408, 708 to the vehicle. A first gearset 349, 649 is coupled to the first bracket assembly 344, 644 and configured for operative engagement with the first steering column 308, 608. A second gearset 449, 749 is coupled to the second bracket assembly 444, 744 and configured for operative engagement with the second steering column 408, 708. A cross shaft 1166, 2066 operatively couples the first gearset 349, 649 to the second gearset 449, 749. The first gearset 349, 649 is configured to be operatively coupled to a steering gear 1172, 2072 of the vehicle. The first bracket assembly 344, 644 is configured to facilitate tilting of an upper steering shaft 10, 510 of the first steering column 308, 608 with respect to a lower steering shaft 312, 612 of the first steering column 308, 608.

According to one aspect, the first bracket assembly 344, 644 comprises a first bracket subassembly 346, 646 that is positionally fixed with respect to the vehicle and a second bracket subassembly 324, 624 that is movable with respect to the first bracket subassembly 346, 646 and supports the upper steering shaft 10, 510 of the first steering column 308, 608.

According to one aspect, the first gearset 349, 649 is supported by the first bracket subassembly 346, 646.

According to one aspect, the assembly further comprises a roller 362, 662 connected to the second bracket subassembly 324, 624, the roller 362, 662 configured to slide within a slot 354, 356, 654, 656 in the first bracket subassembly 346, 646 as the second bracket subassembly 324, 624 moves with respect to the first bracket subassembly 346, 646.

According to one aspect, the first gearset 349, 649 is coupled to the steering gear 1172, 2072 of the vehicle via the lower steering shaft 312, 612 of the first steering column 308, 608.

According to one aspect, the cross shaft 1166, 2066 is configured to transfer second steering column steering inputs from the second gearset 449, 749 to the first gearset 349, 649, and the first gearset 349, 649 is configured to transfer the second steering column steering inputs to the steering gear 1172, 2072 of the vehicle via the lower steering shaft 312, 612 of the first steering column 308, 608.

According to one aspect, the cross shaft 1166, 2066 is configured to transfer first steering column steering inputs from the first gearset 349, 649 to the second gearset 449, 749, and the second gearset 449, 749 is configured to transfer the first steering column steering inputs to the second steering column 408, 708.

According to one aspect, the assembly further comprises a longitudinally extensible and retractable first connector shaft 2065 operatively coupled to the first gearset 649. The cross shaft 2066 is operatively coupled between the first connector shaft 2065 and the second gearset 749.

According to one aspect, the assembly further comprises a longitudinally extensible and retractable second connector shaft 2067 operatively coupled to the second gearset 749. The cross shaft 2066 is operatively coupled between the first and second connector shafts 2065, 2067.

According to one aspect, the cross shaft 2066 is supported on a firewall 2016 of the vehicle.

According to another example of the present disclosure, an assembly for a motor vehicle comprises a first bracket assembly 344, 644 coupling a first steering column 308, 608 to the vehicle in a manner such that at least an upper portion of the first steering column 308, 608 is tiltable with respect to the vehicle. A second bracket assembly 444, 744 couples a second steering column 408, 708 to the vehicle. A first gearset 349, 649 is coupled to the first bracket assembly 344, 644 and operatively coupled to the first steering column 308, 608 to receive first steering column steering inputs. A second gearset 449, 749 is coupled to the second bracket assembly 444, 744 and operatively coupled to the second steering column 408, 708 to receive second steering column steering inputs. A cross shaft 1166, 2066 is operatively coupled between the first gearset 349, 649 and the second gearset 449, 749 such that second steering column steering inputs to the second gearset 449, 749 are transmitted to the first gearset 349, 649.

According to one aspect, the first steering column steering inputs to the first gearset 349, 649 are transmitted to the second gearset 449, 749.

According to one aspect, the second gearset 449, 749 is configured such that the first steering column steering inputs are transmitted from the second gearset 449, 749 to the second steering column 408, 708.

According to one aspect, the first bracket assembly 344, 644 comprises a first bracket subassembly 346, 646 that is positionally fixed with respect to the vehicle and a second bracket subassembly 324, 624 that is movable with respect to the first bracket subassembly 346, 646 and supports the upper portion of the first steering column 308, 608.

According to one aspect, the first gearset 349, 649 is supported by the first bracket subassembly 346, 646.

According to one aspect, the assembly further comprises a roller 362, 662 connected to the second bracket subassembly 324, 624, the roller 362, 662 configured to slide within a slot 354, 356, 654, 656 in the first bracket subassembly 346, 646 as the second bracket subassembly 324, 624 moves with respect to the first bracket subassembly 346, 646.

According to one aspect, the assembly further comprises a longitudinally extensible and retractable first connector shaft 2065 operatively coupled to the first gearset 649. The cross shaft 2066 is coupled between the first connector shaft 2065 and the second gearset 749.

According to one aspect, the assembly further comprises a longitudinally extensible and retractable second connector shaft 2067 operatively coupled to the second gearset 749. The cross shaft 2066 is operatively coupled between the first and second connector shafts 2065, 2067.

According to one aspect, the cross shaft 2066 is supported on a firewall 2016 of the vehicle.

According to one aspect, the first gearset 349, 649 is operatively coupled to a steering gear 1172, 2072 of the vehicle via a lower portion of the first steering column 308, 608.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

What is claimed is:

1. An assembly for equipping a motor vehicle with dual-steer capabilities, the assembly comprising:
   a first bracket assembly configured to couple a first steering column to the vehicle;
   a second bracket assembly configured to couple a second steering column to the vehicle;
   a first gearset coupled to the first bracket assembly and configured for operative engagement with the first steering column;
   a second gearset coupled to the second bracket assembly and configured for operative engagement with the second steering column; and
   a cross shaft operatively coupling the first gearset to the second gearset;
   wherein the first gearset is configured to be operatively coupled to a steering gear of the vehicle;
   wherein the first bracket assembly is configured to facilitate tilting of an upper steering shaft of the first steering column with respect to a lower steering shaft of the first steering column; and
   wherein the first bracket assembly comprises a first bracket subassembly that is positionally fixed with respect to the vehicle and a second bracket subassembly that is movable with respect to the first bracket subassembly and supports the upper steering shaft of the first steering column.

2. The assembly of claim 1, wherein the first gearset is supported by the first bracket subassembly.

3. The assembly of claim 1, further comprising a roller connected to the second bracket subassembly, the roller configured to slide within a slot in the first bracket subassembly as the second bracket subassembly moves with respect to the first bracket subassembly.

4. The assembly of claim 1, wherein the first gearset is coupled to the steering gear of the vehicle via the lower steering shaft of the first steering column.

5. The assembly of claim 4, wherein the cross shaft is configured to transfer second steering column steering inputs from the second gearset to the first gearset, and wherein the first gearset is configured to transfer the second steering column steering inputs to the steering gear of the vehicle via the lower steering shaft of the first steering column.

6. The assembly of claim 4, wherein the cross shaft is configured to transfer first steering column steering inputs from the first gearset to the second gearset, and wherein the second gearset is configured to transfer the first steering column steering inputs to the second steering column.

7. An assembly for equipping a motor vehicle with dual-steer capabilities, the assembly comprising:
   a first bracket assembly configured to couple a first steering column to the vehicle;
   a second bracket assembly configured to couple a second steering column to the vehicle;
   a first gearset coupled to the first bracket assembly and configured for operative engagement with the first steering column;
   a second gearset coupled to the second bracket assembly and configured for operative engagement with the second steering column;
   a cross shaft operatively coupling the first gearset to the second gearset; and
   a longitudinally extensible and retractable first connector shaft operatively coupled to the first gearset;
   wherein the cross shaft is operatively coupled between the first connector shaft and the second gearset;
   wherein the first gearset is configured to be operatively coupled to a steering gear of the vehicle; and
   wherein the first bracket assembly is configured to facilitate tilting of an upper steering shaft of the first steering column with respect to a lower steering shaft of the first steering column.

8. The assembly of claim 7, further comprising a longitudinally extensible and retractable second connector shaft operatively coupled to the second gearset;

wherein the cross shaft is operatively coupled between the first and second connector shafts.

9. The assembly of claim 7, wherein the cross shaft is supported on a firewall of the vehicle.

10. An assembly for a motor vehicle, the assembly comprising:

a first bracket assembly coupling a first steering column to the vehicle in a manner such that at least an upper portion of the first steering column is tiltable with respect to the vehicle;

a second bracket assembly coupling a second steering column to the vehicle;

a first gearset coupled to the first bracket assembly and operatively coupled to the first steering column to receive first steering column steering inputs;

a second gearset coupled to the second bracket assembly and operatively coupled to the second steering column to receive second steering column steering inputs; and a cross shaft operatively coupled between the first gearset and the second gearset such that the second steering column steering inputs to the second gearset are transmitted to the first gearset;

wherein the first bracket assembly comprises a first bracket subassembly that is positionally fixed with respect to the vehicle and a second bracket subassembly that is movable with respect to the first bracket subassembly and supports the upper portion of the first steering column.

11. The assembly of claim 10, wherein the first steering column steering inputs to the first gearset are transmitted to the second gearset.

12. The assembly of claim 11, wherein the second gearset is configured such that the first steering column steering inputs are transmitted from the second gearset to the second steering column.

13. The assembly of claim 10, wherein the first gearset is supported by the first bracket subassembly.

14. The assembly of claim 10, further comprising a roller connected to the second bracket subassembly, the roller configured to slide within a slot in the first bracket subassembly as the second bracket subassembly moves with respect to the first bracket subassembly.

15. The assembly of claim 10, wherein the first gearset is operatively coupled to a steering gear of the vehicle via a lower portion of the first steering column.

16. An assembly for a motor vehicle, the assembly comprising:

a first bracket assembly coupling a first steering column to the vehicle in a manner such that at least an upper portion of the first steering column is tiltable with respect to the vehicle;

a second bracket assembly coupling a second steering column to the vehicle;

a first gearset coupled to the first bracket assembly and operatively coupled to the first steering column to receive first steering column steering inputs;

a second gearset coupled to the second bracket assembly and operatively coupled to the second steering column to receive second steering column steering inputs;

a cross shaft operatively coupled between the first gearset and the second gearset such that the second steering column steering inputs to the second gearset are transmitted to the first gearset; and a longitudinally extensible and retractable first connector shaft operatively coupled to the first gearset;

wherein the cross shaft is coupled between the first connector shaft and the second gearset.

17. The assembly of claim 16, further comprising a longitudinally extensible and retractable second connector shaft operatively coupled to the second gearset;

wherein the cross shaft is operatively coupled between the first and second connector shafts.

18. The assembly of claim 16, wherein the cross shaft is supported on a firewall of the vehicle.

* * * * *